United States Patent
Navab et al.

(10) Patent No.: US 12,175,610 B2
(45) Date of Patent: Dec. 24, 2024

(54) METHOD OF ALIGNING VIRTUAL AND REAL OBJECTS

(71) Applicant: TECHNISCHE UNIVERSITÄT MÜNCHEN, Munich (DE)

(72) Inventors: Nassir Navab, Munich (DE); Alejandro Martin Gomez, Munich (DE)

(73) Assignee: TECHNISCHE UNIVERSITÄT MÜNCHEN, Munich (DE)

( * ) Notice: Subject to any disclaimer, the term of this patent is extended or adjusted under 35 U.S.C. 154(b) by 98 days.

(21) Appl. No.: 18/012,831

(22) PCT Filed: Jul. 6, 2021

(86) PCT No.: PCT/EP2021/068613
§ 371 (c)(1),
(2) Date: Dec. 23, 2022

(87) PCT Pub. No.: WO2022/008490
PCT Pub. Date: Jan. 13, 2022

(65) Prior Publication Data
US 2023/0274517 A1    Aug. 31, 2023

(30) Foreign Application Priority Data
Jul. 6, 2020  (EP) .................................. 20184229

(51) Int. Cl.
*G06T 19/20* (2011.01)
*G06F 3/01* (2006.01)
(Continued)

(52) U.S. Cl.
CPC ............ *G06T 19/006* (2013.01); *G06F 3/011* (2013.01); *G06F 3/016* (2013.01); *G06T 19/20* (2013.01);
(Continued)

(58) Field of Classification Search
CPC .................. G06T 19/006; G06T 19/20; G06T 2219/2004; G06F 3/011; G06F 3/012; G06F 3/013; G06F 3/016; G06V 10/752
See application file for complete search history.

(56) References Cited

U.S. PATENT DOCUMENTS 5,613,013 A    3/1997  Schuette
7,379,077 B2   5/2008  Bani-Hashemi et al.
(Continued)

OTHER PUBLICATIONS

Javad Fotouhi et al., "Reflective-AR Display: An Interaction Methodology for Vitural-Real Alignment in Medical Robotics," IEEE Robotics and Automation Letters, vol. 5, No. 2, Apr. 2020, pp. 2722-2729.

(Continued)

*Primary Examiner* — Vijay Shankar
(74) *Attorney, Agent, or Firm* — Barclay Damon LLP

(57) ABSTRACT

A method for aligning the positions and orientations of a real object and a virtual object in real space, the virtual object corresponding to a virtual replica of the real object, the method comprising visualizing at least one alignment feature superimposed on or replacing a representation of the virtual object in a field of view containing the real object, wherein the alignment feature is indicative of a position and orientation of the virtual object in real space, and wherein the at least one alignment feature complements a shape and/or surface pattern of the real object, such that the alignment feature and the real object form a composite object with complementing patterns and/or shapes in the field of view, when the real object and the virtual object are aligned.

19 Claims, 13 Drawing Sheets

(51) Int. Cl.
  *G06T 19/00* (2011.01)
  *G06V 10/75* (2022.01)
  *G06V 20/20* (2022.01)
(52) U.S. Cl.
  CPC .......... *G06V 10/752* (2022.01); *G06V 20/20* (2022.01); *G06T 2219/2004* (2013.01)

(56) References Cited

U.S. PATENT DOCUMENTS

| | | | |
|---|---|---|---|
| 9,939,605 | B2 | 4/2018 | Georgiev |
| 10,192,361 | B2 | 1/2019 | Li et al. |
| 10,884,493 | B2 * | 1/2021 | Parshionikar ........... G06F 1/163 |
| 11,266,919 | B2 * | 3/2022 | Bear ...................... G06F 3/0346 |
| 11,969,666 | B2 * | 4/2024 | Bear ...................... H04N 21/47 |
| 2020/0368616 | A1 * | 11/2020 | Delamont ............ H04N 13/239 |

OTHER PUBLICATIONS

Alejandro Martin-Gomez et al., "Visualization Techniques for Precise Alignment in VR: A Comparative Study," 2019 IEEE Conference on Virtual Reality and 3D User Interfaces (VR), Osaka, Japan, 2019, pp. 735-741.

International Searching Authority/EP, International Search Report and Written Opinion of the International Searching Authority, Application No. PCT/EP2021/068613, dated Dec. 13, 2021, 22 pages.

Ohan Oda et al., "Virtual Replicas for Remote Assistance in Virtual and Augmented Reality," Proceedings of the 28th Annual ACM Symposium on User Interface Software & Technology, UIST '15, Jan. 1, 2015, pp. 405-415, XP055735041, DOI: 10.1145/2807442.2807497, ISBN: 978-1-4503-3779-3.

Fotouhi Javad et al., "Reflective-AR Display: An Interaction Methodology for Virtual-to-Real Alignment in Medical Robotics," IEEE Robotics and Automation Letters, IEEE, vol. 5, No. 2, Feb. 10, 2020, pp. 2722-2729, XP011774742, DOI: 10.1109/LRA.2020.2972831.

Alejandro Martin-Gomez et al., "Visualization Techniques for Precise Alignment in VR: A Comparative Study," 2019 IEEE Conference on Virtual Reality and 3D User Interfaces (VR), IEEE, Mar. 23, 2019, pp. 735-741, XP033597758, DOI: 10.1109/VR.2019.8798135.

* cited by examiner

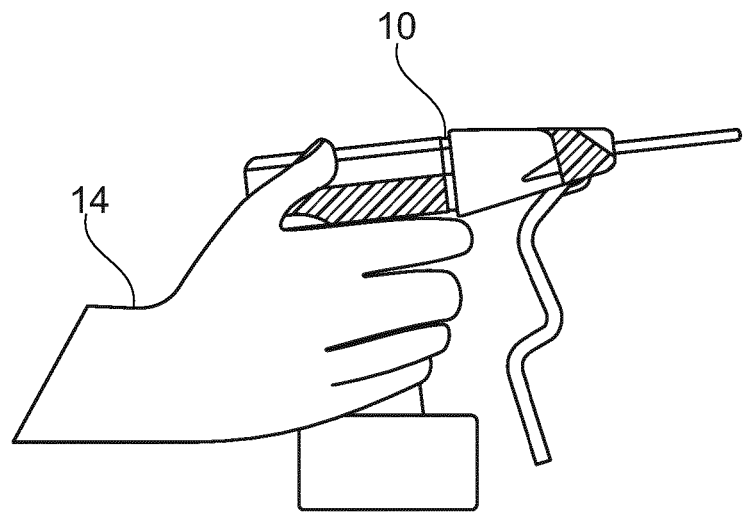
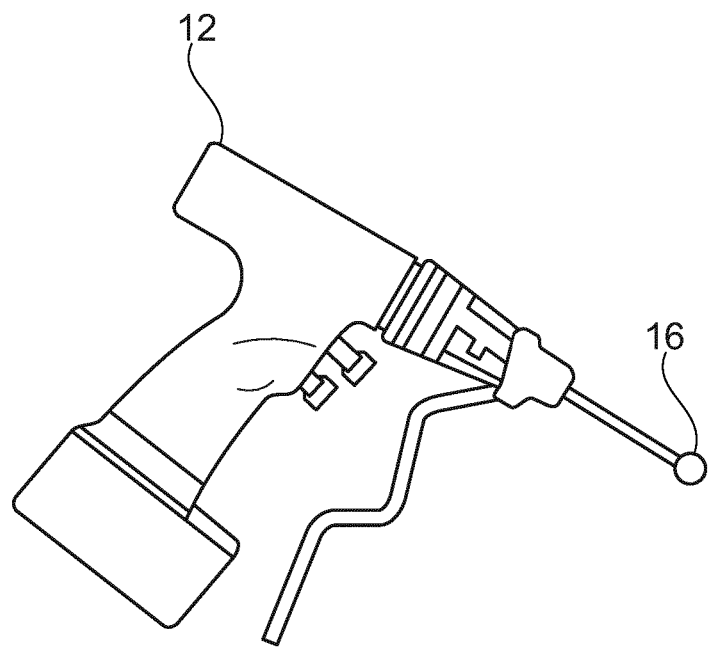
Fig. 1

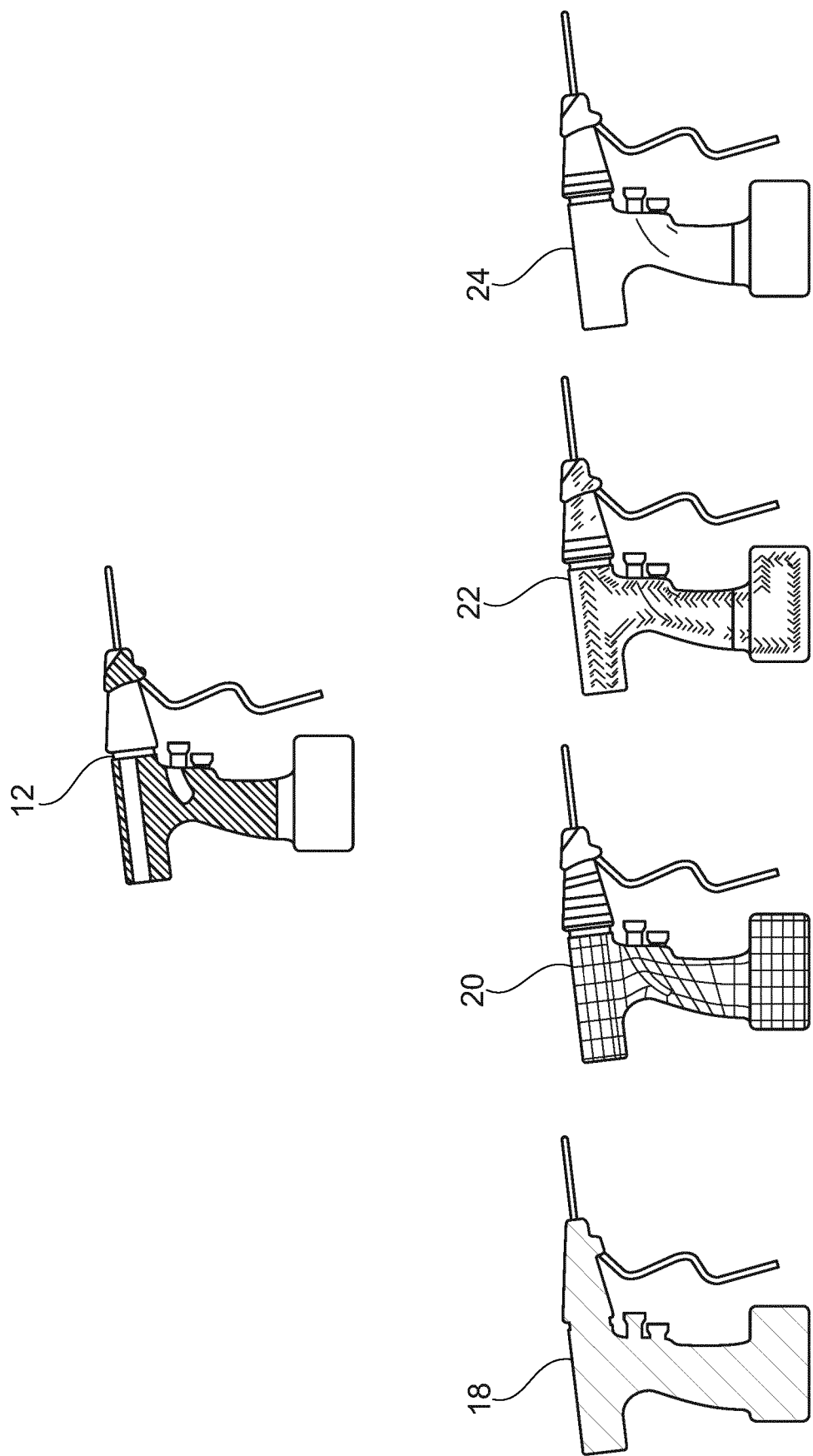

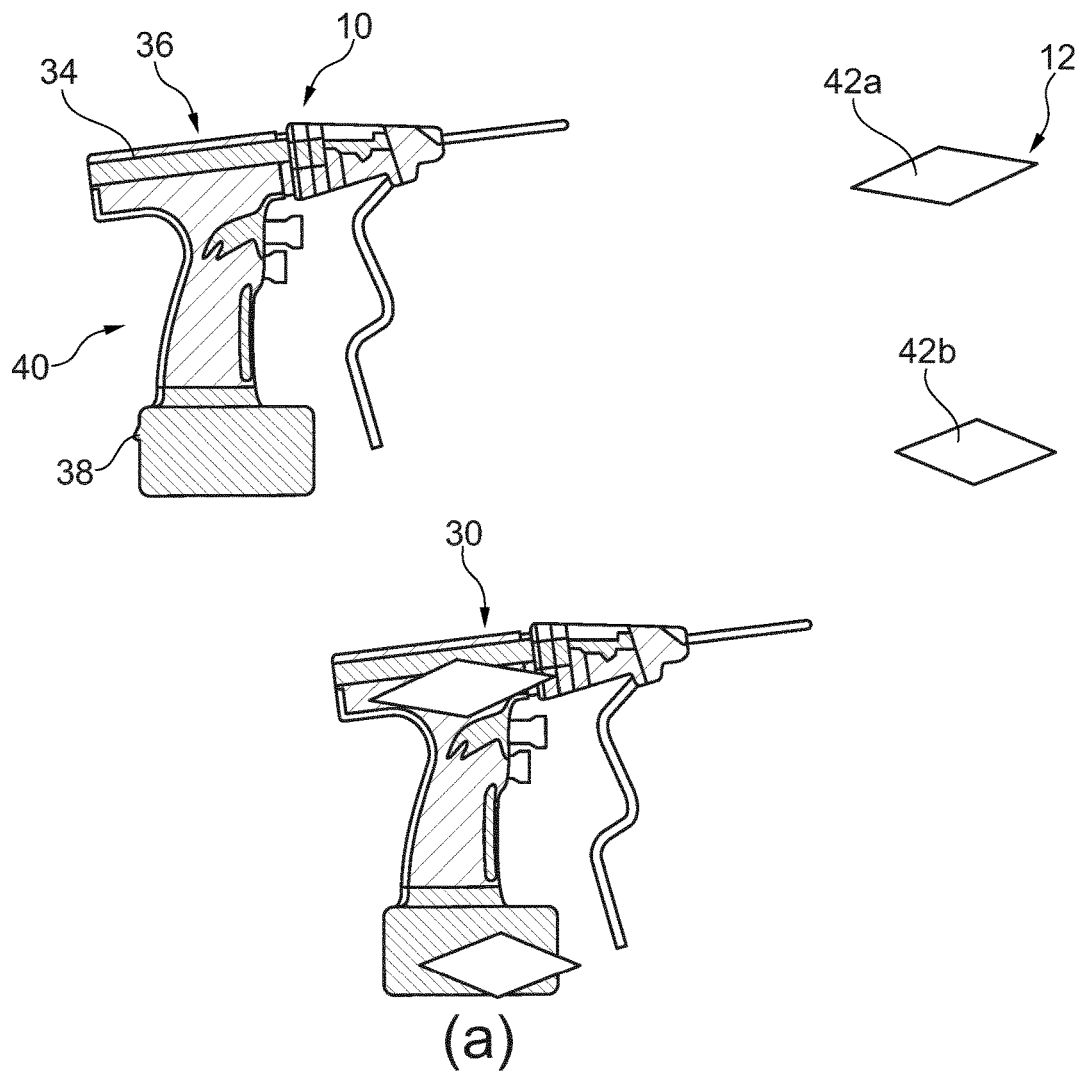
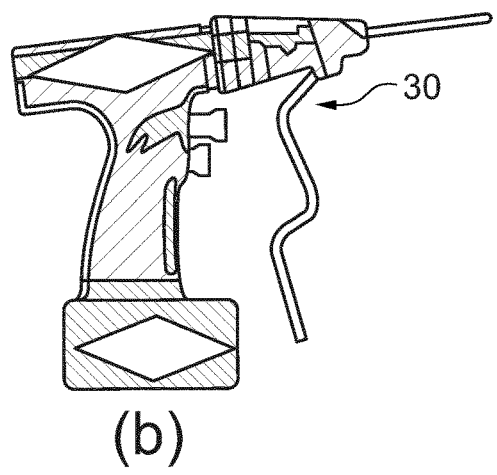
Fig. 7

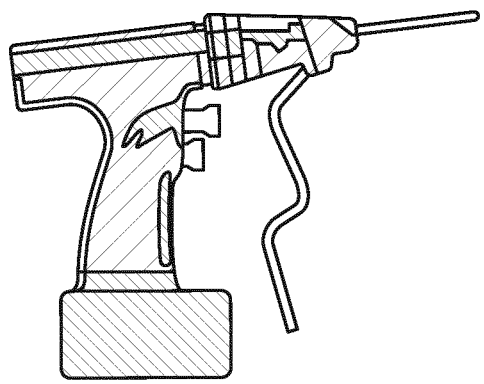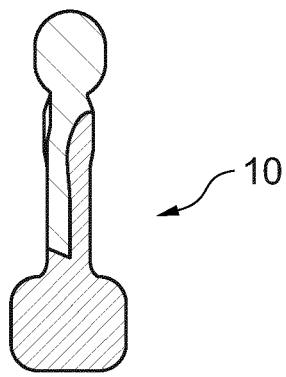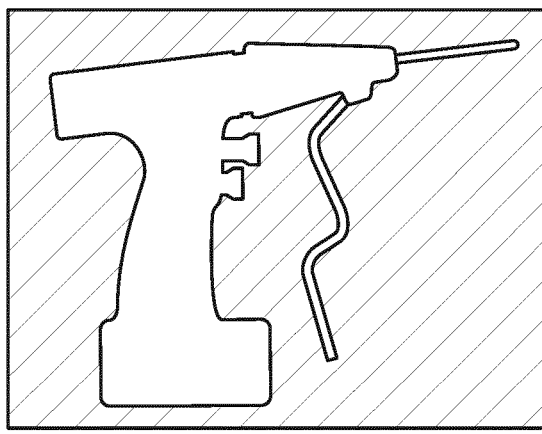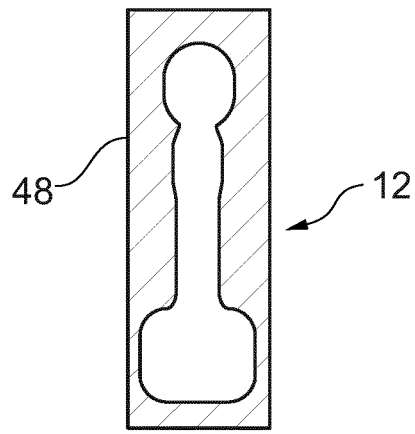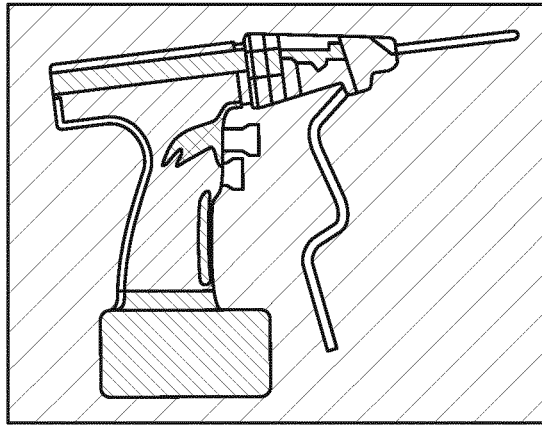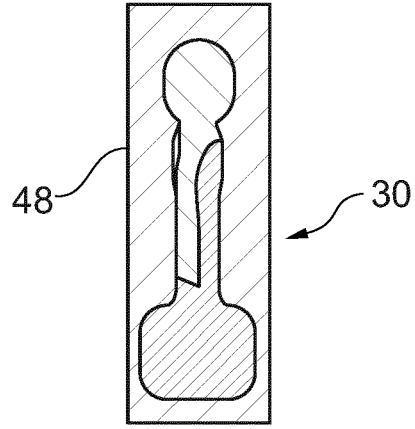
Fig. 9

METHOD OF ALIGNING VIRTUAL AND REAL OBJECTS

CROSS-REFERENCE TO RELATED APPLICATIONS

This application is the national phase entry of International Patent Application No. PCT/EP2021/068613 filed on Jul. 6, 2021, and claims the benefit of European Patent Application No. 20184229.1 filed Jul. 6, 2020, the disclosures of which are incorporated herein by reference in their entirety.

FIELD OF THE INVENTION

The present invention is in the field of computer assisted positioning of objects by human operators. More precisely, the present invention relates to the alignment of real and virtual objects with each other in real space using a visualization of the virtual object in a field of view containing the real object.

BACKGROUND

With the advances of virtual and augmented reality there are and there will be products and solutions requiring users to position objects, tools or robot arms into positions defined for corresponding virtual objects in a virtual or augmented reality environment. The virtual objects could be presented as graphical renderings and visualized within Head-Mounted Displays (HMD) or other kinds of displays such as mobile phones or external displays and the user will be asked to carry out real to virtual (R2V) or virtual to real (V2R) alignment, i.e. to either align a real object to a virtual object or to align a virtual object to a real object in a virtual or augmented view containing the real object.

The positioning of real objects based on virtually defined target positions could have applications in several fields, such as medicine, where automated docking of robotic equipment to a patient would be prevented by regulatory restrictions, and where manual approach of the therapeutic robot towards the patient by trained medical staff will likely remain inevitable for a significant period of time. Nonetheless, surgical staff could be instructed with visualized virtual information during the positioning task, such as to optimize the movement capabilities of the robot for an upcoming task once docked to the patient.

For example, as outlined in Fotouhi et al. ("*Reflective-AR Display: An Interaction Methodology for Virtual-to-Real Alignment in Medical Robotics*", IEEE Robotics and Automation Letters, vol. 5, no. 2, pp. 2722-2729, April 2020) surgical staff would see the position of a virtual surgical robot arm on top of the patient in an HMD or on a display and will need to bring the actual arm to the exact position in which the virtual arm is visualized. In other words, a virtual replica of the real robot arm is generated in a computing platform and displayed to the user in a real space view of the patient to act as a guide for the three-dimensional positioning of the corresponding real robot arm.

Martin et al. ("*Visualization Techniques for Precise Alignment in VR: A Comparative Study*", 2019 IEEE Conference on Virtual Reality and 3D User Interfaces (VR), Osaka, Japan, 2019, pp. 735-741) studied the alignment accuracy as well as user acceptance of currently tested visualization techniques for V2R tasks for four different visualizations (semitransparent, wireframe, Fresnel-derivative and Silhouette) of a CAD replica of the real object in a view containing the real object. The authors found that alignment accuracy as well as user acceptance seemed to be higher for visualizations featuring comparatively lower occlusion of the real object, such as a silhouette rendering of the CAD replica.

Ohan Oda et al. ("*Virtual Replicas for Remote Assistance in Virtual and Augmented Reality*") discloses different methods for using virtual replicas of real objects to assist in a guided positioning task. In each method, the positions of all real objects are tracked, such that the system knows the real space coordinates of all relevant objects. The preferred method relies on an instructor performing an alignment task with virtual objects, wherein the alignment process is shown to the local user in an augmented reality view. In another method, the instructor adds contact points to the virtual replicas of the real objects as metaobjects, and the user is presented with connecting lines between the intended position of the metaobjects and the current position of the metaobjects during alignment.

U.S. Pat. No. 7,379,077 B2 teaches an alignment method for aligning an instrument with an intended path. The method includes visualizing the path itself, as well as graphics path guide elements for defining an intended viewing angle. The graphics path guide elements are concentric circles displaced along the intended path to jointly form a bull's eye when the view angle of the user is aligned with the path. By swiveling the instrument about a predefined contact point, the back of the instrument can be aligned to lie in the center of the bull's eye. The center of the back-side may be marked on the instrument, such that the instrument forms the central dot of the bull's eye.

SUMMARY OF THE INVENTION

The known methods however provide little assistance to the user while performing the alignment or are limited to pre-programmed instructions which are application specific. Moreover, even with low occlusion renderings of the virtual object, the user needs to repeatedly reposition himself and change his viewpoint to obtain reasonable alignment accuracy both with respect to the translational degrees of freedom referred to as the three-dimensional position herein as well as with respect to the three rotational degrees of freedom of the real/virtual object. Further, the final result of overlaying virtual and real objects may be unsatisfactory to confirm exact alignment of the real and virtual objects and may hence limit the obtainable maximum alignment accuracy.

In view of this state-of-the-art, the object of the invention is to provide an improved method of aligning real and virtual objects with improved guidance to the user to achieve faster as well as more accurate alignment.

This object is solved by a method for aligning the positions and orientations of a real object and a virtual object in real space and a corresponding computer program according to the independent claims. The dependent claims relate to preferred embodiments.

According to a first aspect, the invention relates to a method for aligning the positions and orientations of a real object and a virtual object in real space, the virtual object corresponding to a virtual replica of the real object. The method comprises visualizing at least one alignment feature superimposed on or replacing a representation of the virtual object in a field of view containing the real object, wherein the at least one alignment feature is indicative of a position and orientation of the virtual object in real space. The at least one alignment feature complements a shape and/or surface pattern of the real object, such that the at least one alignment feature and the real object form a composite object with complementing patterns and/or shapes in the field of view, when the real object and the virtual object are correctly aligned.

The field of view may be a perspective of a head mounted display, e.g. an augmented reality (AR) headset, or may be a digitized view of a real space perspective, such as a camera view, which is presented to a human operator with a visualization device, e.g. a computer or tablet screen, a virtual reality (VR) headset, or similar devices suitable to enable human perception of the digitized view. In the first case, the field of view can be an augmented view of the real world, with virtual information superimposed onto the real field of view of the human operator by the head mounted display, while in the other case, the virtual information can be superimposed on the digitized camera view and presented to the human operator. The field of view should be associated with positional and rotational information on the origin of the field of view and the view angle in real space to reliably present the virtual object to the human operator in a fixed real world coordinate system. For example, head-mounted displays can already determine the current view angle and position with a combination of acceleration sensors, gyroscopes, and triangulation of positional reference signals and can therefore allow the augmentation of the human operator's field of view with a visualization of a three-dimensional virtual object associated with a position and orientation in real space. However, the view angle and position of the origin may be obtained using any suitable means, such as photogrammetry of markers or objects recorded in the field of view alongside the real object.

The virtual object corresponds to a virtual replica of the real object, such as a CAD drawing or a 3D-scan of the real object, but may also be simplified to include only position and orientation information of a current pose of the virtual object or of a target pose which the real object should attain. The virtual object is associated with real space coordinates, e.g. a position and orientation of the virtual object in real space. The skilled person will appreciate that the virtual object in principle may only be associated with virtual coordinates; however, said virtual coordinates of the virtual object are considered to correspond to real space coordinates by a suitable mapping from the virtual coordinates onto real space in order to align the real object and the virtual object in real space. The method may include rendering a representation of the virtual object in the field of view, such as a silhouette rendering of the virtual object. However, in addition to or instead of the representation of the virtual object, the method comprises visualizing the at least one alignment feature in the field of view which should not be a replicated feature of the real object but complements a surface pattern or shape of the virtual object. Hence, instead of occluding the features of the real object with virtual replicas of its features, the method complements the features of the real object with the at least one alignment feature when the virtual object and the real object are aligned. The human operator may then confirm correct alignment based on the composite object formed by the at least one alignment feature and the real object in the field of view. Preferably, the at least one alignment feature only partially occludes the real object, such as occluding 50% or less of the real object, when the virtual object and the real object are aligned.

The at least one alignment feature complements a surface pattern and/or shape of the real object. The surface pattern may be an intrinsic pattern on the real object, may be painted on or adhered to the real object for the purposes of alignment or may be projected onto the real object, e.g. projected onto the desired position of the real object in real space such as to (predictably) pattern the real object when it is aligned. The at least one alignment feature may complement the surface pattern by including a virtual texture on the virtual object which forms a characteristic and recognizable composite surface pattern when the real object and the virtual object are aligned, e.g. a continuous pattern or a pattern having a uniform color. As mismatching patterns are easily recognizable by the human operator and also indicate or visualize an amount of dislocation, also referred to as a mismatch distance herein, the at least one alignment feature may both guide the user and allow confirmation of correct alignment. On the other hand, the at least one alignment feature may also complement a shape of the real object, such as by including a shape not present in the real object which complements the shape of the real object, e.g. by completing a composite shape (e.g. an interlocking shape). However, the at least one alignment feature may also supplement a shape and/or surface pattern with a different second shape, e.g. by inscribing a circular shape into a square feature of the real object, when the real object and the virtual object are aligned. In each case, human perception of geometrical mismatches can be exploited to improve guidance of the alignment with limited occlusion of the real object in the field of view.

The method can be suitable both for aligning a virtual object to a real object as well as for aligning a real object to a virtual object, as the complementing alignment feature guides the human operator and allows confirmation of the alignment in both cases. However, as alignment of a virtual object to a real object may be easier with current technology, the method may comprise a series of alignment steps, such as first aligning the virtual object with the real object and then providing instructions to the user or a positioning apparatus to position the real object in an intended position. For example, the human operator may align a virtual replica of a robot to a real robot thereby providing a real space position and orientation reference for the robot, and the robot may then be translated towards a desired pose in real space based on the real space position and orientation reference. The method may be applied continuously during an alignment task or may be used selectively when the human operator wishes to perform high precision or final alignment after an initial approach. Further, different alignment features may be presented for coarse and fine alignment of the virtual object and the real object.

In preferred embodiments, the at least one alignment feature comprises an alignment pattern which is complimentary to a surface pattern on the real object, such that the surface pattern and the complimentary pattern form a characteristic continuous pattern, when the real object and the virtual object are aligned.

The alignment pattern may be a virtual texture forming a surface pattern on a visible or invisible three-dimensional model of the virtual object, which virtual texture is visualized in the field of view to align the real object and the virtual object. For example, the real object may include a surface pattern with an incomplete or interrupted shading and the alignment pattern may be a virtual texture patterning the virtual object, such that the real object attains a complete and/or continuous shading in the field of view, when the real object and the virtual object are aligned.

In preferred embodiments, the alignment pattern comprises a repeating alignment pattern in contrasting colors overlaying a shape of the virtual object, wherein the repeating alignment pattern complements a repeating pattern on the real object, such that the repeating pattern of the real object and the repeating alignment pattern form a characteristic continuous pattern, when the real object and the virtual object are aligned.

For example, the repeating pattern may be a checkerboard pattern patterning the real object, and the repeating alignment pattern may comprise the same checkerboard pattern as a virtual texture of the virtual object in inverse or contrasting colors.

In preferred embodiments, the alignment pattern forms a repeating superposition pattern with the surface pattern on the real object, when the real object and the virtual object are not aligned.

For example, the surface pattern may comprise a grid and the alignment pattern may include a complementing grid such that a Moiré pattern is formed when the real object and the virtual object are out of rotational alignment. The repeating superposition pattern may provide guidance to the user as to the degree of misalignment and may thus improve both alignment speed as well as final alignment accuracy.

In preferred embodiments, the at least one alignment feature comprises an alignment shape which complements a shape of the real object when it is visualized in the field of view, such that the apparent contour of the real object in the field of view is complemented by the alignment shape, when the real object and the virtual object are aligned.

The alignment shape may be a virtual three dimensional virtual shape which is visualized to complement at least a portion of the apparent contour of the virtual object at the virtual object's current position and orientation, such as an interlocking or form-fitting shape complementing the virtual boundaries of at least a portion of the virtual object. When the virtual object is moved close to the real object, the complementing alignment shape may clearly indicate an alignment mismatch between the virtual object and the real object when visualized in sharply contrasting colors through an overlap with the apparent contour of the real object or a gap formed with the real object without significantly occluding the real object.

In preferred embodiments, the method visualizes a dynamic apparent contour of the alignment shape in the field of view containing the real object, such that the alignment shape would not obstruct a representation of the virtual object at the current position and having the current orientation of the virtual object in real space.

In preferred embodiments, the alignment shape comprises a virtual mold of at least a portion of the virtual object, such that the alignment shape complements and protrudes outward from the apparent contour of the real object in the field of view, when the real object and the virtual object are aligned.

The virtual mold of the virtual object may be automatically generated based on a scan of the real object or a CAD drawing thereof and may thus be readily available. The mold may be a virtual mold of the entire virtual object or of a portion thereof, such as a section of the virtual object e.g. a half or quarter mold. The mold may be visualized in the field of view as a negative cutout of the virtual object's contour or as a solid object.

In other words, the alignment shape may protrude outward from the apparent contour of the real object by a certain distance, such as at least 2%, at least 5% or at least 10% of the diameter of the apparent contour, to form a two-dimensional shape in the field of view in order to facilitate visual confirmation of the alignment between the real object and the virtual object by an operator.

In preferred embodiments, the at least one alignment feature comprises a substantially two-dimensional alignment geometry fitting a face of the real object, wherein the shape of the alignment geometry differs from the outline of the face, such that the alignment geometry connects multiple edges and/or vertices of the face of the object, when the real object and the virtual object are aligned.

Hence, the at least one alignment feature may supplement the shape and/or surface pattern of the real object with the alignment geometry. The face may be a delimitable portion of the real object, such as a planar or constant curvature surface element of the real object, e.g. a face of a spherical or cuboid element of the real object. Additionally or alternatively, the face of the object may be defined by a surface pattern on the real object, such as by a face formed by a surface portion having uniform color. The alignment geometry differs from the outline of the face to limit occlusion with the real object and instead provides a human discernible alignment clue by the connection of multiple edges and/or vertices of the face of the real object. Mismatches may be easily identified by a human operator due to an apparent asymmetrical fitting of the alignment geometry into the face of the real object, and may thus facilitate the alignment task.

In some embodiments, the at least one alignment feature comprises a substantially two-dimensional alignment geometry fitting a face of the real object, wherein the shape of the alignment geometry differs from the outline of the face and is centered in the face, when the real object and the virtual object are aligned.

In preferred embodiments, the alignment geometry comprises a bisecting alignment line which bisects the face, when the real object and the virtual object are aligned.

A bisecting alignment line may limit occlusion while providing a clear alignment clue due to easily perceivable asymmetries for the human operator when the real object and the virtual object are misaligned. In some embodiments, the bisecting alignment line is a diagonal bisector of the face, while in other embodiments, the bisecting alignment line is a perpendicular bisector of the sides of a symmetrical face.

In preferred embodiments, the alignment geometry is not a wireframe representation of the virtual object.

While the alignment geometry may coincide with one or more wireframe lines of a simplified virtual object geometry, the alignment geometry should not be equal to a full wireframe representation of the virtual object. In other words, the alignment geometry should be limited to faces of a minimum size or limited to a selected portion of the virtual object's faces to avoid occlusion of the real object.

In preferred embodiments, the alignment geometry comprises an alignment polygon and/or an alignment ellipse, wherein the alignment polygon and/or the alignment ellipse are/is inscribed into the face and/or circumscribed about the face, when the real object and the virtual object are aligned.

In preferred embodiments, the field of view shows a second virtual field of view containing the real object, wherein the second virtual field of view comprises at least one second alignment feature superimposed on or replacing a representation of the virtual object in the second virtual field of view.

In general, the depth perception of human operators lacks in comparison to the lateral perception. The second virtual field of view may be visualized in the field of view of the operator to improve alignment in three-dimensional space. In particular, the second field of view may capture the real object from an oblique or perpendicular field of view to facilitate the alignment of the virtual object and the real object by a human operator with limited depth perception.

The second alignment feature may complement the real object in the second field of view in a manner similar to that of the first alignment feature illustrated above to improve alignment speed and accuracy. The second field of view may be captured by any suitable recording device, such as one or more cameras providing additional alternative views of the object.

In preferred embodiments, the second alignment feature visualized in the second virtual field of view is different from the at least one alignment feature.

For example, the at least one alignment feature may feature a coarse alignment pattern to perform coarse alignment of the object, and the second alignment feature may comprise a fine alignment pattern with increased feature density and/or detail allowing the human operator to perform fine adjustments of the alignment along a perpendicular alignment direction to the field of view after initial coarse alignment.

In preferred embodiments, the at least one alignment feature is visualized in a head mounted display of an operator augmenting the perceived field of view containing the real object and/or the at least one alignment feature is visualized in a camera view containing the real object or a three-dimensional view derived of said camera view.

In preferred embodiments, the method further comprises generating the at least one alignment feature based on the shape and/or surface pattern of a virtual replica of the real object.

For example, the method may automatically generate a virtual texture with a complementing alignment pattern with respect to the alignment pattern such as by determining whether a color value of the surface pattern is smaller than a given threshold and generating a surface texture with a non-transparent or partially transparent shaded texture to form a contrasting pattern on the virtual object. Further, the method may automatically generate a complementing shape to a shape of the virtual replica of the real object. The skilled person will appreciate that the method for generating the at least one alignment feature may be automated, or partially automated, such as by presenting an operator with a complementing shape and/or texture and the operator may define the aforementioned threshold or manually define regions free of the generated alignment feature. Hence, the positioning task may be simplified by at least partially generating the at least one alignment feature in an automated process.

In a second aspect the invention relates to a method for aligning a real object to a target position and target orientation in real space. The method comprises visualizing a representation of a first virtual object and/or at least one alignment feature superimposed on or replacing the representation of the first virtual object in a field of view at the target position and having the target orientation for aligning the real object to the first virtual object. The method further comprises visualizing a representation of a second virtual object and/or at least one alignment feature superimposed on or replacing the representation of the second virtual object in the field of view for aligning the second virtual object to the real object by displacing the second virtual object in the field of view. The method further comprises determining a transformation between the position and/or orientation of the first virtual object and the position and/or orientation of the second virtual object, and visualizing a transformation clue in the field of view for displacing the real object based on the transformation for aligning the real object to the target position and target orientation in real space.

The inventors found that alignment of a virtual object to a real object may feature increased alignment accuracy with current technology, as compared to the alignment of a real object to a virtual object. Hence, following an initial potentially coarse approach of the real object towards the target pose, the pose of the real object may be registered by alignment of the second virtual object to the real object. Following this alignment of the second virtual object to the real object, a human operator may be instructed to perform adjustments of the pose of the real object by visualizing the transformation clue, such as an arrow displayed in the field of view, to transfer the real object towards the target pose. The transformation clue may be generated based on a transformation between the positions and orientations of the first virtual object and the second virtual object. In some embodiments, the real object is displaced automatically based on the transformation, e.g. a movement of a robot arm is initiated based on the transformation, after an operator validates the transformation based on the transformation clue.

Preferably, at least one alignment feature superimposed on or replacing the representation of the first virtual object or the second virtual object is visualized, such as to incorporate the method according to the first aspect as part of aligning the real object and the first virtual object or the second virtual object. Most preferably, different alignment features are presented for coarse and fine alignment of the first virtual object and second virtual object, respectively, and the real object.

In a third aspect, the invention relates to a computer program or computer program product comprising machine readable instructions which when executed by a processing unit cause the processing unit to implement a method according to any one of the preceding embodiments or aspects.

The computer program may contain instructions to initialize the position and orientation of the virtual object with a set of coordinates corresponding to real space coordinates. The computer program may further contain instructions to detect a current position and view angle associated with the field of view in real space, such as a position and orientation of a head-mounted display, and may render the at least one alignment feature according to the current position and orientation of the virtual object to conform with the current position and view angle of the field of view. Additionally, the computer program may contain instructions to receive and process input from a user to update a position and/or orientation of the virtual object and update the visualization of the at least one alignment feature accordingly.

The machine readable instructions of the computer program or computer program product may be stored on a non-transitory machine-readable storage medium to be accessed by the processing unit.

In a fourth aspect, the invention relates to a method for alignment of the positions and orientations of a real object and a virtual object in real space, the virtual object corresponding to a virtual replica of the real object, the method comprising visualizing at least one first alignment feature superimposed on or replacing a representation of the virtual object in a field of view containing the real object, wherein the at least one first alignment feature is indicative of a position and orientation of the virtual object in real space; visualizing at least one secondary alignment feature in a field of view containing the real object and the at least one first alignment feature, wherein the at least one secondary alignment feature is indicative of a position and orientation of a second identical virtual object in real space; wherein the at least one secondary alignment feature complements a shape and/or pattern of the at least one first alignment feature, such that the at least one secondary alignment feature and the at least one first alignment feature form a composite object with complementing patterns and/or shapes, when the at least one secondary alignment feature and the at least one first alignment feature are aligned along at least one dimension; and consolidating the first alignment feature and the second alignment feature to align the virtual object to the real object.

In the first aspect of the invention, the at least one alignment feature complements the real object. However, the invention may also be practiced by aligning two virtual objects from different views, wherein an alignment feature can be associated with each virtual object, and the at least one alignment features of the respective objects may complement each other when they are aligned. In one embodiment, the method comprises changing the origin of the field of view before visualizing the secondary alignment feature. In other embodiments, the method may be practiced collaboratively, with two human operators aligning a respective virtual object to the real object in parallel or in alternating fashion, and each operator is presented with complementing alignment features associated with the respective virtual objects, such as to improve cooperation between multiple operators.

In a fifth aspect, the invention relates to a positioning system to align the positions and orientations of a real object and a virtual object in real space, the virtual object corresponding to a virtual replica of the real object. The system comprises a positioning module configured to determine an origin and a view angle of a field of view containing the real object in real space, and a display module to visualize at least one alignment feature in the field of view according to the origin and the view angle. The at least one alignment feature is superimposed on or replaces a representation of the virtual object in the field of view; and the at least one alignment feature complements a shape and/or surface pattern of the real object, such that the at least one alignment feature and the real object form a composite object with complementing patterns and/or shapes in the field of view, when the real object and the virtual object are aligned.

The skilled person will appreciate that the display module and the positioning module may be implemented in software, hardware or a combination thereof and the modules may be implemented in the same device or in different devices. Further, each of the modules may be implemented by a plurality of devices, such as the positioning module being implemented in a plurality of sensing devices which cooperate to determine the current origin and view angle of the field of view. For example, the positioning module may be implemented in a head-mounted display and the display module may be implemented in a processing device coupled wirelessly to the head-mounted display, and the display module receives the current origin and view angle from the head-mounted display and visualizes the at least one alignment feature according to the field of view. Information for rendering the visualized at least one alignment feature may then be transmitted from the display module to the head-mounted display to be displayed to an operator of the system. The at least one alignment feature may be stored on a physical storage associated with the device or may be streamed to the system on-demand via a communication pathway, such as a WiFi or LAN connection to a server. Additionally, the at least one alignment feature may be generated dynamically based on a virtual replica of the real object and the current origin and view angle of the field of view, such as by rendering an interlocking shape complementing the apparent contour of the virtual object at its current position and orientation in the field of view.

In preferred embodiments, the system further comprises a display to display the at least one alignment feature in the field of view.

The display may be a head mounted display augmenting the perceived field of view of an operator containing the real object and a display for displaying a camera view containing the real object or a three-dimensional view derived of said camera view. In some embodiments, the system comprises one or more cameras to provide additional views containing the real object and the display module may further visualize the additional view and associated alignment features.

In preferred embodiments, the system further comprises a generation module configured to receive a virtual replica of the real object and to generate the at least one alignment feature based on the shape and/or surface pattern of a virtual replica of the real object.

In preferred embodiments, the system further comprises a manipulation module to receive user input pertaining to a translation and/or rotation of the virtual object and to update a position and/or orientation of the virtual object in the field of view according to the user input.

In preferred embodiments, the system further comprises the real object having a surface pattern and the at least one alignment feature comprises an alignment pattern which is complimentary to a surface pattern on the real object, such that the surface pattern and the complimentary pattern form a characteristic continuous pattern, when the real object and the virtual object are aligned.

In other preferred embodiments, the system implements any combination of the aforementioned embodiments of the first aspect.

DETAILED DESCRIPTION OF EMBODIMENTS

The features and numerous advantages of the method and corresponding computer program according to the present invention will best be understood from a detailed description of preferred embodiments with reference to the accompanying drawings, in which:

FIG. 1 illustrates an example of a positioning task;

FIG. 2 illustrates exemplary visualization strategies for visualizing a representation of a virtual object;

FIG. 7 illustrates another example of an alignment geometry and different stages of a corresponding alignment process between a virtual object and a real object;

FIG. 9 illustrates an example of an alignment shape and a corresponding alignment example between a virtual object and a real object;

Figure 3A:
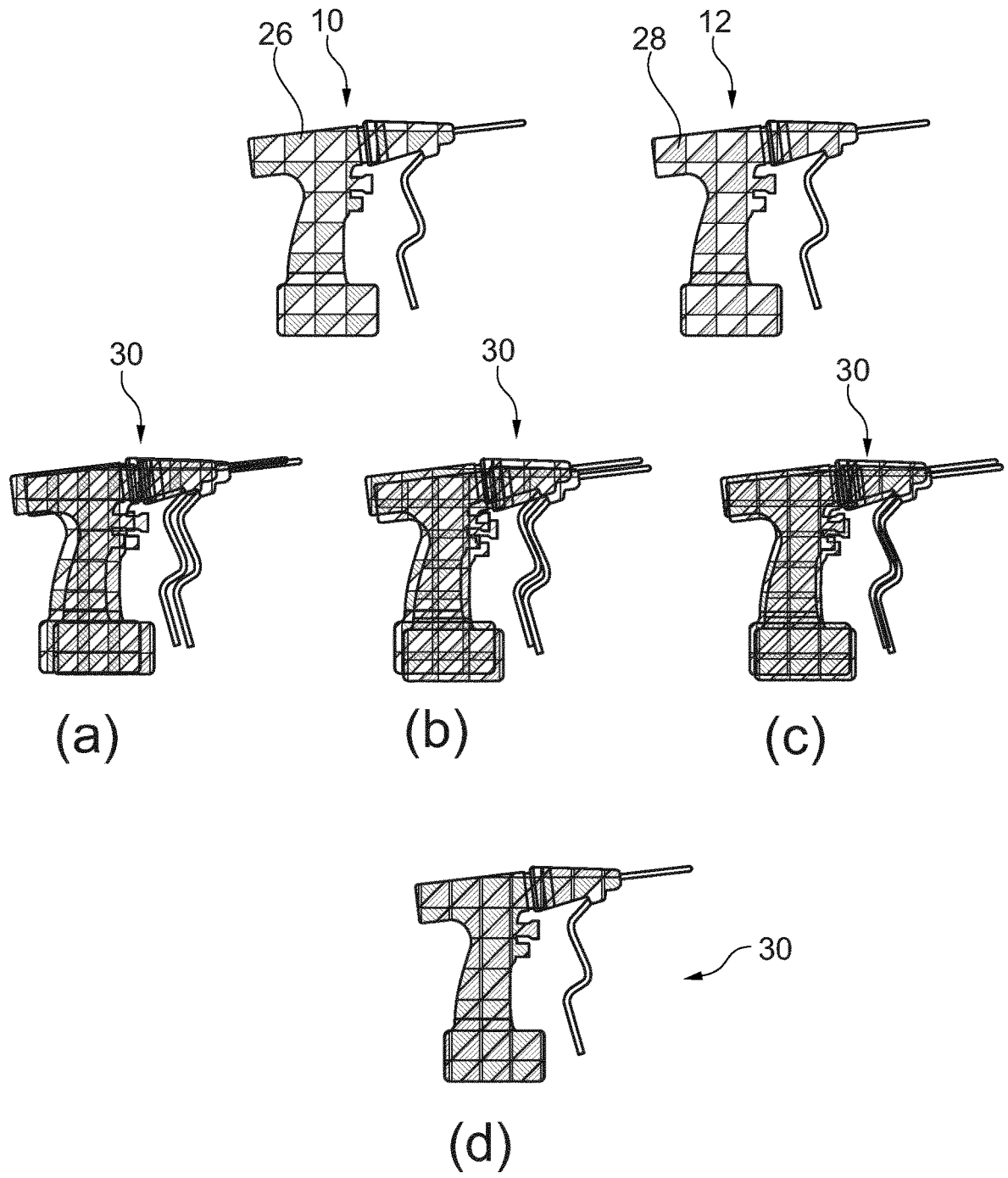
FIG. 3A illustrates an example of an alignment pattern and different stages of a corresponding alignment process between a virtual object and a real object.

FIG. 1 illustrates an example of a positioning task for aligning the real space positions of a real object 10 and a virtual object 12. The real object 10 is illustrated as a drill, e.g. a surgical power drill, held by a hand 14 of a human operator performing the positioning task. The virtual object 12 is a virtual replica of the real object 10, e.g. a virtual power drill 12, visualized by a silhouette representation of the virtual object 12 presenting the outline and sharp angles of the virtual object 12 as black lines in a field of view. The virtual power drill 12 is aligned to an intended borehole 16 with known real space coordinates, wherein the virtual drill 12 features a target pose, i.e. a combination of a position and corresponding orientation/rotation, allowing optimal drilling of the intended borehole 16. For example, the drill may be optimally aligned for a surgical bone drilling procedure and the intended borehole 16 may be inferred from a scan of the patient, e.g. a computer tomography scan.

For simplicity of illustration, the virtual object 12 will in the following be considered as being visualized in an augmented reality (AR) device which is able to supplement the perception of an operator of real space with perceivable (visual) information, e.g. a head mounted display displaying rendered graphical information in the field of view of a human operator. It will further be considered that the AR device is able to determine the current origin and view angle of the perceived field of view of the human operator. Hence, the virtual drill 12, which is associated with real space coordinates, can be rendered to conform with the current position and view angle of the field of view, such as to allow the human operator to use the virtual drill 12 as reference for the placement of the real drill 10. However, the skilled person will appreciate that any suitable field of view may be used and that the real object may also be captured in a digitized view, such as in the field of view of one or more cameras as recording devices, and the virtual object may be shown in said digitized view, e.g. as part of a VR rendering of the real object's 10 pose in real space.

FIG. 2 illustrates exemplary visualization strategies for visualizing a representation of the virtual object 12 in the field of view. The virtual object 12 can be a CAD drawing of the real drill 10 and may be visualized in the field of view as a rendered geometry with a virtual texture corresponding to surface patterns of the real object 10. However, the virtual object may also be rendered in a simplified fashion e.g. with reduced detail or reduced texture to limit occlusion with the real object 10. For example, a representation of the virtual object 12 may be rendered in the field of view as a uni-color or multi-color semitransparent rendering 18 of the polygonal geometry. Further, a representation of the virtual object 12 may also be provided by a wireframe geometry representation 20 by connecting vertices of an underlying polygonal mesh of the virtual object 12 with visible lines in the field of view. The wireframe geometry representation 20 may then represent the polygonal geometry of the virtual object 12. A wireframe geometry representation 20 may be generated by connecting all of the vertices of the polygonal mesh, or by connecting only a portion of the vertices, such as all vertices bounding the outer surface of the polygonal mesh or a visible portion thereof, such as vertices on the visible outer surface facing the origin of the field of view.

These representations 18, 20 however significantly occlude the real object 10 and other features in the field of view or have to be rendered with low opacity, which may reduce the efficiency and accuracy of the alignment task. Other representations comprise partially shaded representations 22 comprising only partial shading of the virtual object's 12 surfaces, such as shading of surfaces of the object 12 having a surface normal which is oblique to the view angle or deviates from the view angle by a minimum deviation. Reduced occlusion can further be obtained by rendering only a silhouette representation 24 of the virtual object 12, e.g. by visualizing the boundary of the apparent contour of the virtual object 12 in the field of view and optionally visualizing sharp edges of the virtual object's 12 geometry as illustrated in FIG. 2. While such representations 22, 24 with reduced occlusion may facilitate the alignment task for the human operator, they provide little guidance for the in principle six-dimensional alignment task of aligning both position and orientation of the real object 10/virtual object 12 to obtain an intended pose.

The invention therefore provides an alignment feature visualized instead of or in addition to the representation 18, 20, 22, 24 of the virtual object 12 which complements a shape and/or surface pattern of the real object 10, such that the alignment feature and the real object 10 form a composite object with complementing patterns and/or shapes in the field of view, when the real object 10 and the virtual object 12 are aligned. Further, a representation 18, 20, 22, 24 of the virtual object 12 need not necessarily be visualized in the field of view to practice the invention as will be shown in some of the following examples.

FIG. 3A illustrates an example of an alignment feature for facilitating aligning the positions and orientations of a virtual object 12 and a real object 10. The real object 10 comprises a surface pattern 26 comprised of pairs of differently shaded right triangles fitted into a rectangular grid, such that the rectangular grid may be equally composed of right triangles with contrasting shading. The surface pattern 26 may then form a repeating pattern with contrastingly shaded elements on the surface of the real object 10.

The virtual object 12 is associated with an alignment pattern 28 in the field of view which is formed by a virtual texture following the geometry of the virtual object 12. The alignment pattern 28 mimics the geometry of the rectangular grid of the surface pattern 26 on the real object 10 and is equally provided with differently shaded right triangles fitted into a rectangular grid. However, the differently shaded right triangles of the alignment pattern 28 are shaded substantially inverse to the differently shaded right triangles on the real object 10, e.g. a dark shaded right triangle in a certain position on the real object 10 corresponds to a light shaded right triangle in the corresponding position on the alignment pattern 28 texturing the virtual object 12 and vice versa. In other words, the alignment pattern 28 comprises a shading texture with complimentary shading to the surface pattern 26 on the real object 10, such that the surface pattern 26 and the complimentary alignment pattern 28 form a continuous pattern, when the real object 10 and the virtual object 12 are aligned.

It is noted that the terms light shaded and dark shaded are considered relative terms, and a light shaded surface of the alignment pattern may only be more transparent than a corresponding dark shaded surface or may be entirely transparent. In some embodiments, the alignment pattern 28 comprises substantially transparent and shaded sections, as light shaded and dark shaded sections, respectively, to minimize occlusion of the real object 10 and improve contrast in the perceived composite object 30. Further, the skilled person will appreciate that the light shaded and dark shaded portions may in addition or in the alternative be differently colored to provide complementary patterns 26, 28 with contrasting elements.

Figure elements (a)-(d) illustrate a process of the virtual object 12 approaching the real object 10, or vice versa, in different illustrative stages. In stage (a), the virtual object 12 and the real object 10 are horizontally misaligned, and the perceived composite object 30 shows horizontally spaced features. In stage (b), the virtual object 12 and the real object 10 are both horizontally and vertically misaligned, and the perceived composite object 30 shows a grid of horizontally and vertically spaced features. In stage (c), the virtual object 12 and the real object 10 are vertically misaligned, and the perceived composite object 30 shows vertically spaced features. In stage (d), the virtual object 12 and the real object 10 are aligned and the surface pattern 26 and the complimentary pattern 28 form a continuously shaded perceived composite object 30 corresponding to a continuous or uniform shading of the real object 10 in the field of view.

In each stage (a)-(c), the perceived composite object 30 provides guidance towards alignment via a perceived mismatch of the complementing patterns 26, 28 while in stage (d) the perceived composite object 30 confirms correct alignment of the real object 10 and the virtual object 12 through uniform shading, which can result in both faster and more accurate alignment by a human operator. As the surface pattern 26 and the alignment pattern comprise contrasting triangular elements, the perceived composite object 30 will indicate alignments mismatch in three corresponding spatial directions. When the alignment pattern 28 is wrapped about the three-dimensional geometry of the virtual object 12 as a virtual texture, the three spatial directions may facilitate alignment in three dimensions as well as rotational alignment.

Figure 3B:
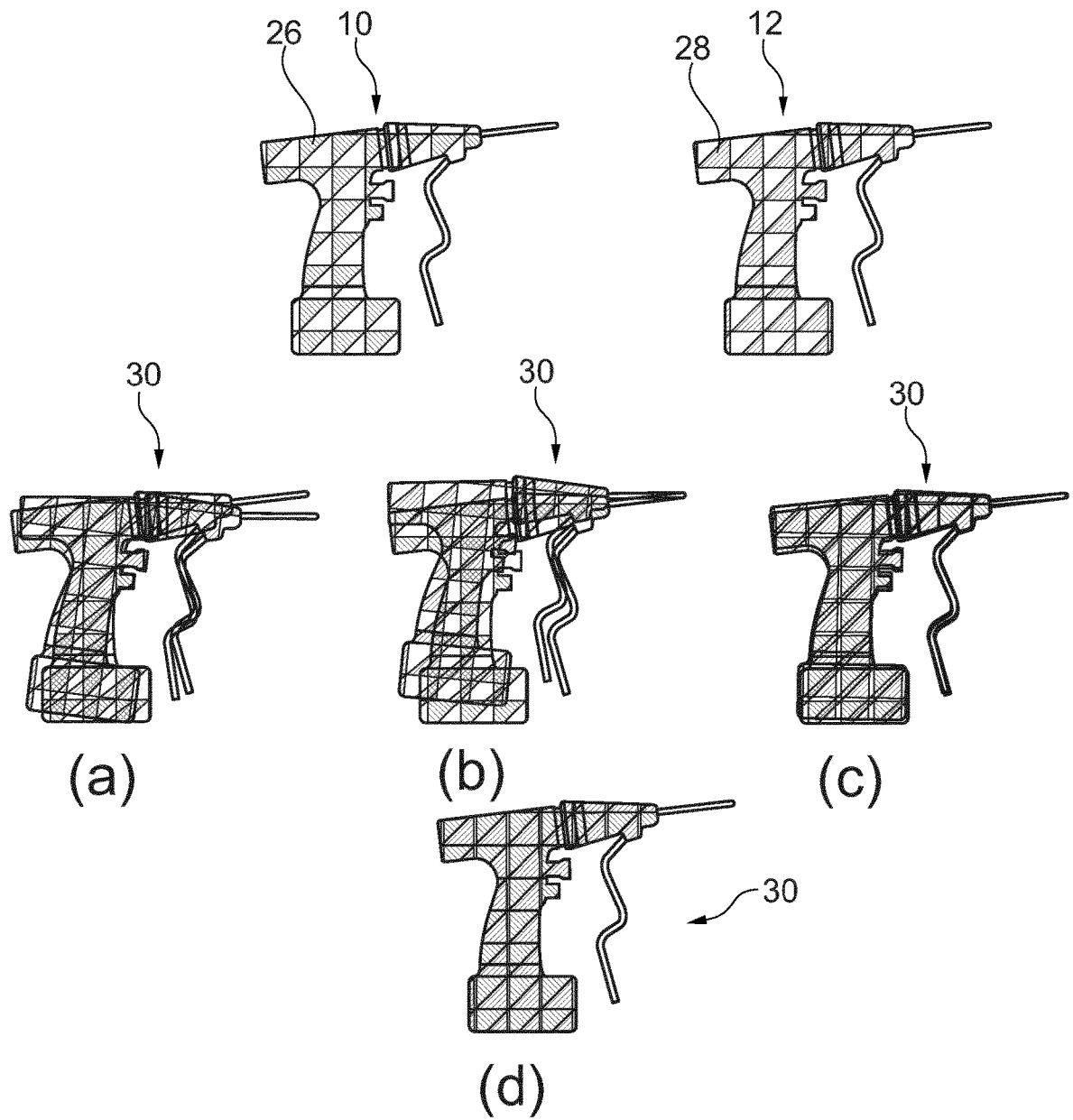
FIG. 3B illustrates another example of an alignment pattern and different stages of a corresponding alignment process between a virtual object and a real object.

FIG. 3B illustrates another example of an alignment approach between the positions and orientations of a virtual object 12 and a real object 10. The real object 10 comprises the same surface pattern 26 as the real object 10 depicted in FIG. 3A comprised of pairs of differently shaded right triangles fitted into a rectangular grid, to form a repeating pattern with contrastingly shaded elements on the surface of the real object 10. The virtual object 12 is likewise associated with the alignment pattern 28 of FIG. 3A to complement the surface pattern 26. The alignment pattern 28 mimics the geometry of the rectangular grid of the surface pattern 26 on the real object 10 and comprises differently shaded right triangles fitted into a corresponding rectangular grid, but having inverse shading with respect to the surface pattern 26.

Figure elements (a)-(d) illustrate a process of the virtual object 12 approaching the real object 10, or vice versa, in different illustrative stages for an example including rotational mismatch in the plane of projection. In stages (a)-(c), the virtual object 12 and the real object 10 are rotationally misaligned, and the perceived composite object 30 shows a repeating superposition pattern comprising angled features which are formed by straight edges of shaded portions of the alignment pattern 28 and the surface pattern 26. The angled features in the perceived composite object 30 may indicate the mismatch angle to an operator and may provide alignment clues for aligning the real object 10 and the virtual object 12.

In stage (a), the rotational mismatch is comparatively large such that the perceived composite object 30 includes perceivable angled features with the angle indicating a rotational misalignment of the real object 10 and the virtual object 12. In stage (b), the virtual object 12 and the real object 10 are translated relative to each other, such that the perceived composite object 30 changes but still comprises the angled features indicating a perceived mismatch angle. In stage (c), the rotational misalignment as well as the translational misalignment between the virtual object 12 and the real object 10 is reduced such that the virtual object 12 and the real object 10 substantially overlap. Nonetheless, the perceived composite object 30 still indicates a remaining mismatch angle via angled features in the field of view, allowing fine adjustment of the alignment by the user. In stage (d), the virtual object 12 and the real object 10 are aligned and the surface pattern 26 and the complimentary pattern 28 form a continuously shaded perceived composite object 30 in the field of view.

Hence, the combination of a surface pattern 26 on the real object 10 and a complementing alignment pattern 28 associated with the position and orientation of the virtual object 12 may improve guidance for correcting rotational misalignment and may enable a user to differentiate between rotational and translational mismatch in the field of view.

Figure 4:
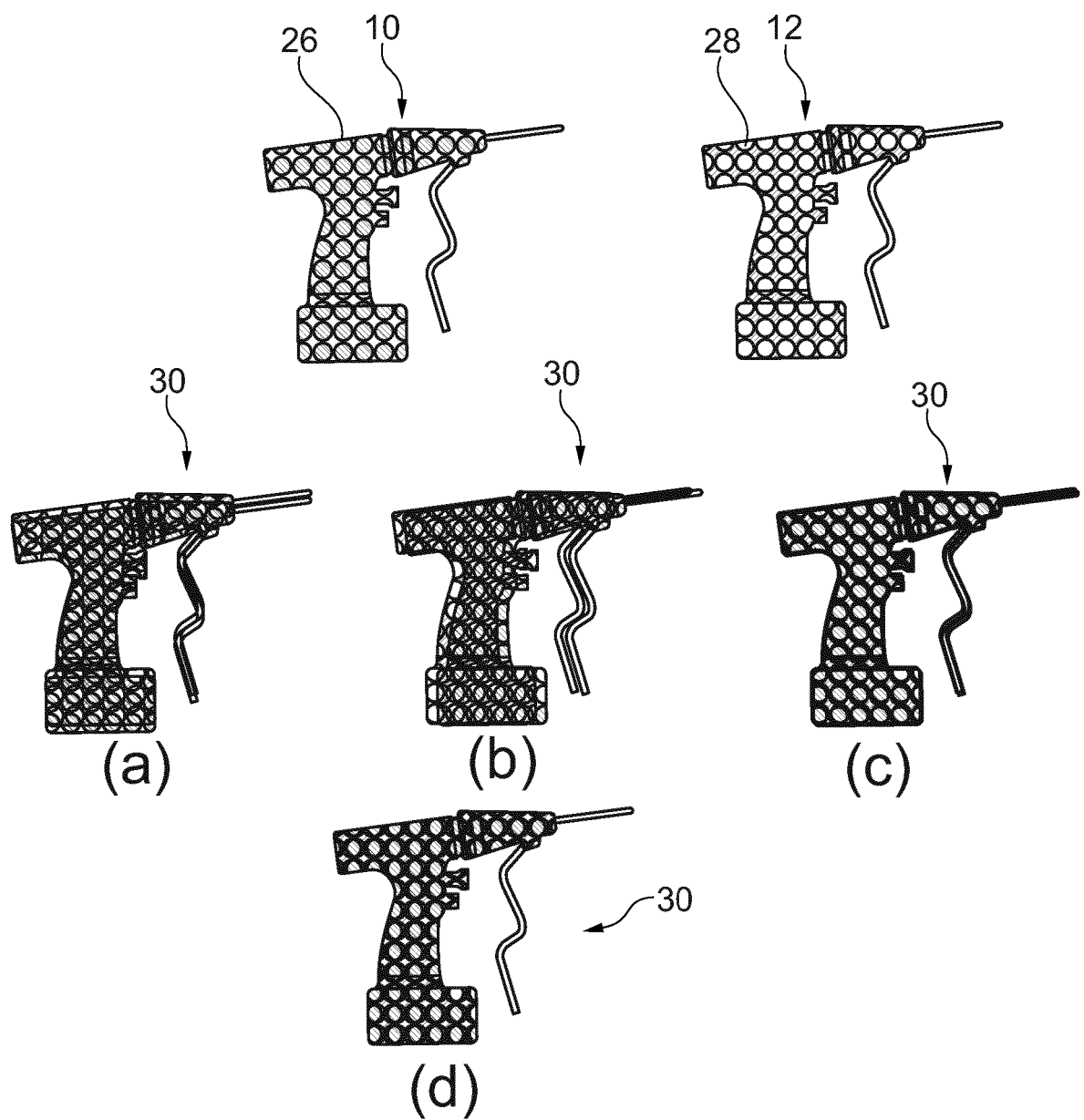
FIG. 4 illustrates another example of an alignment pattern and different stages of a corresponding alignment process between a virtual object and a real object.

FIG. 4 illustrates a similar example of an alignment feature for facilitating aligning the positions and orientations of a virtual object 12 and a real object 10. The real object 10 comprises a surface pattern 26 comprised of light shaded circles inscribed into square elements of a rectangular grid and surrounding dark shaded portions in the square elements, such that the rectangular grid is composed of light shaded circles with contrasting shading to a dark shaded background to form a repeating pattern with contrastingly shaded elements on the surface of the real object 10.

The virtual object 12 is associated with an alignment pattern 28 in the field of view which is formed by a virtual texture following the geometry of the virtual object 12. The alignment pattern 28 mimics the geometry of the surface pattern 26 and is equally provided with shaded circles inscribed into the rectangular grid. However, the circles of the alignment pattern 28 are shaded substantially inverse to the shaded circles on the real object 10, i.e. a light shaded circle on the real object 10 corresponds to a dark shaded circle on the alignment pattern 28 over a light shaded background texturing the virtual object 12. Hence, when the real object 10 and the virtual object 12 are aligned, the dark shaded circle of the alignment pattern 28 will complement the light shaded circle of the surface pattern 26 of the real object 10.

Figure elements (a)-(d) illustrate a process of the virtual object 12 approaching the real object 10, or vice versa, in different illustrative stages. In stages (a) and (b), the virtual object 12 and the real object 10 are vertically and horizontally misaligned, respectively, and therefore the perceived composite object 30 comprises respective vertically and horizontally extending features indicating the degree of mismatch along the primary directions of the grid. In stage (c), the virtual object 12 and the real object 10 are both vertically and horizontally offset, such that the perceived composite object 30 features curved light shaded sections having an alignment corresponding to the offset direction. In stage (d), the virtual object 12 and the real object 10 are aligned and the surface pattern 26 and the complimentary pattern 28 form a continuously shaded perceived composite object 30 in the field of view.

Figure 5:
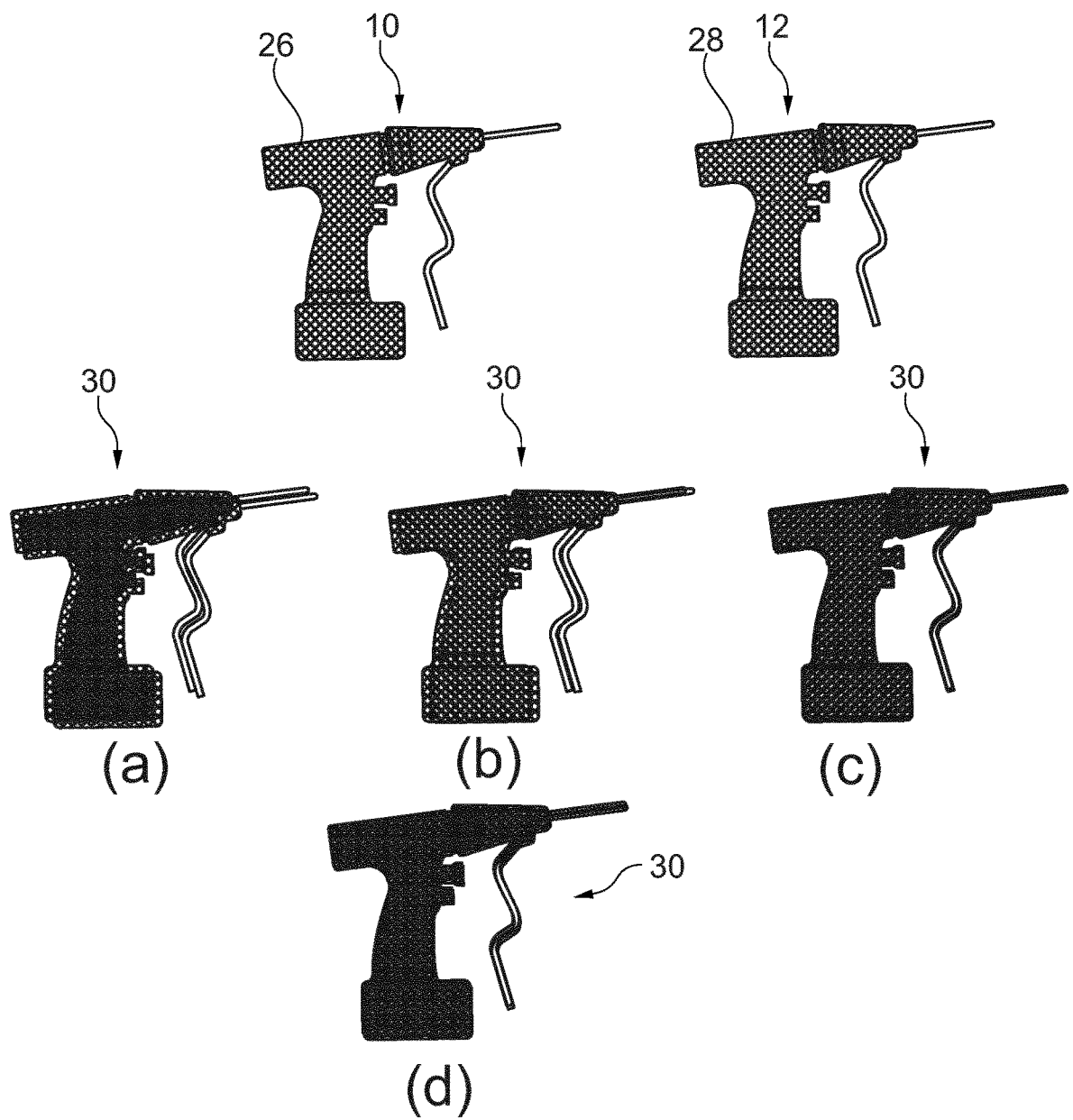
FIG. 5 illustrates another example of an alignment pattern and different stages of a corresponding alignment process between a virtual object and a real object.

FIG. 5 illustrates another example of an alignment feature and corresponding alignment examples between a virtual object 12 and a real object 10. The real object 10 comprises a surface pattern 26 comprised of light shaded circles inscribed into square elements of a rectangular grid and surrounding dark shaded portions in the square elements as the surface pattern 28 of FIG. 4 but with a different (narrower) grid spacing to form a fine repeating grid pattern with contrastingly shaded elements on the surface of the real object 10.

The virtual object 12 comprises an alignment pattern 28 which complements the surface pattern 26 on the real object by comprising shaded elements in textured regions of the virtual object 12 which correspond to regions free of the surface pattern 26 on the real object. Hence, the alignment pattern 28 comprises a complimentary grid pattern. When the real object 10 and the virtual object 12 are aligned, the dark shaded circle of the alignment pattern 28 will complement the light shaded circle of the surface pattern 26 of the real object 10. Further, when the real object 10 and the virtual object 12 are again rotationally misaligned, the patterns 26, 28 may form a repeating superposition pattern on the perceived composite object 30 indicating the mismatch angle by the periodicity of the repeating superposition pattern.

Figure elements (a)-(d) illustrate a process of the virtual object 12 approaching the real object 10, or vice versa, in different illustrative stages. In stages (a) to (c), the virtual object 12 and the real object 10 are approached resulting in periodically overlapping patterns 26, 28 in the perceived composite object 30. In stage (d), the virtual object 12 and the real object 10 are aligned and the surface pattern 26 and the complimentary pattern 28 form a continuously shaded perceived composite object 30 in the field of view.

The spacing of the grid elements may be adapted to the required precision of the alignment task or may not be constant in some embodiments. For example, the spacing of the grid of repeating elements may vary throughout the virtual texture to allow both rough and fine alignment of the virtual object 12 and the real object 10 with the same alignment pattern, while at the same time rendering the correctly aligned position unambiguous.

Figure 6:
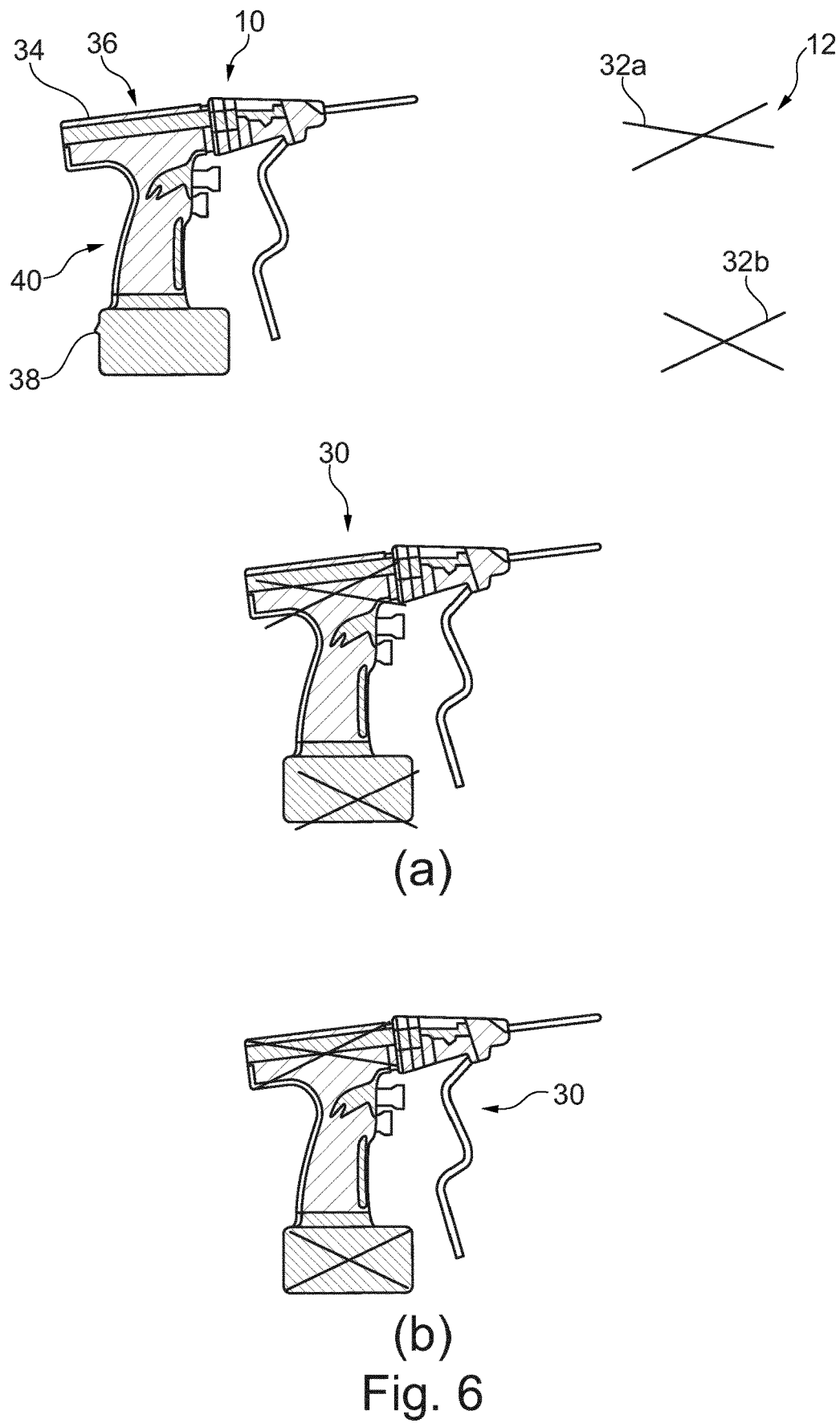
FIG. 6 illustrates an example of an alignment geometry and different stages of a corresponding alignment process between a virtual object and a real object.

FIG. 6 illustrates another example of an alignment feature and corresponding alignment examples between a virtual object 12 and a real object 10. In the illustrated example, the virtual object 12 is not visualized with a representation 18, 20, 22, 24 of the virtual object 12. Instead, only an alignment geometry as an alignment feature is visualized in the form of pairs of bisecting lines 32a, 32b of different faces of the virtual object 12. The pairs of bisecting lines 32a, 32b diagonally bisect lateral faces of the rectangular section 34 of the drill body 36 and of the cuboid counterweight portion 38 of the drill handle 40, respectively.

Figure elements (a) and (b) illustrate a process of the virtual object 12 approaching the real object 10, or vice versa, in two different illustrative stages. In stage (a), the virtual object 12 and the real object 10 are misaligned, such that the bisecting lines 32a, 32b are not centered to their respective faces 34, 38 on the real object 10 but protrude outwards from the faces 34, 38. In stage (b), the virtual object 12 and the real object 10 are aligned, such that the bisecting lines 32a, 32b connect the vertices of the faces 34, 38 of the real object 10 and are centered with respect to the respective faces 34, 38 allowing confirmation of the correct alignment between the real object 10 and the virtual object 12.

FIG. 7 illustrates another example of an alignment feature and corresponding alignment examples between a virtual object 12 and a real object 10. In the illustrated example, the virtual object 12 is again not visualized with a representation 18, 20, 22, 24 of the virtual object 12. Instead, only an alignment geometry as an alignment feature is visualized in the form of shaded polygonal shapes 42a, 42b inscribed into different faces of the virtual object 12. A first polygonal shape 42a is inscribed into a lateral face of the rectangular section 34 of the drill body 36 and a second polygonal shape 42b is inscribed into a lateral face of the cuboid counterweight portion 38 of the drill handle 40.

Figure elements (a) and (b) illustrate a process of the virtual object 12 approaching the real object 10, or vice versa, in two different illustrative stages. In stage (a), the virtual object 12 and the real object 10 are misaligned, such that the shaded polygonal shapes 42a, 42b are not centered to their respective faces 34, 38 on the real object 10 but protrude outwards from the faces 34, 38 of the real object 10. The misalignment of the polygonal shapes 42a, 42b and the real object 10 results in a perceived asymmetry for a human observer in the perceived composite object 30, which allows guided correction of the misalignment. The polygonal shapes 42a, 42b may be symmetric polygons as in FIG. 7, such as point symmetric polygons or polygons with mirror symmetry along at least one, preferably at least two, axes of symmetry to enhance the perceived asymmetry for the human observer when the virtual object 12 and the real object 10 are misaligned. In stage (b), the virtual object 12 and the real object 10 are aligned, such that the shaded polygonal shapes 42a, 42b connect the edges of the faces 34, 38 of the real object 10 and are centered with respect to the face 34, 38 allowing confirmation of the correct alignment between the real object 10 and the virtual object 12.

Figure 8:
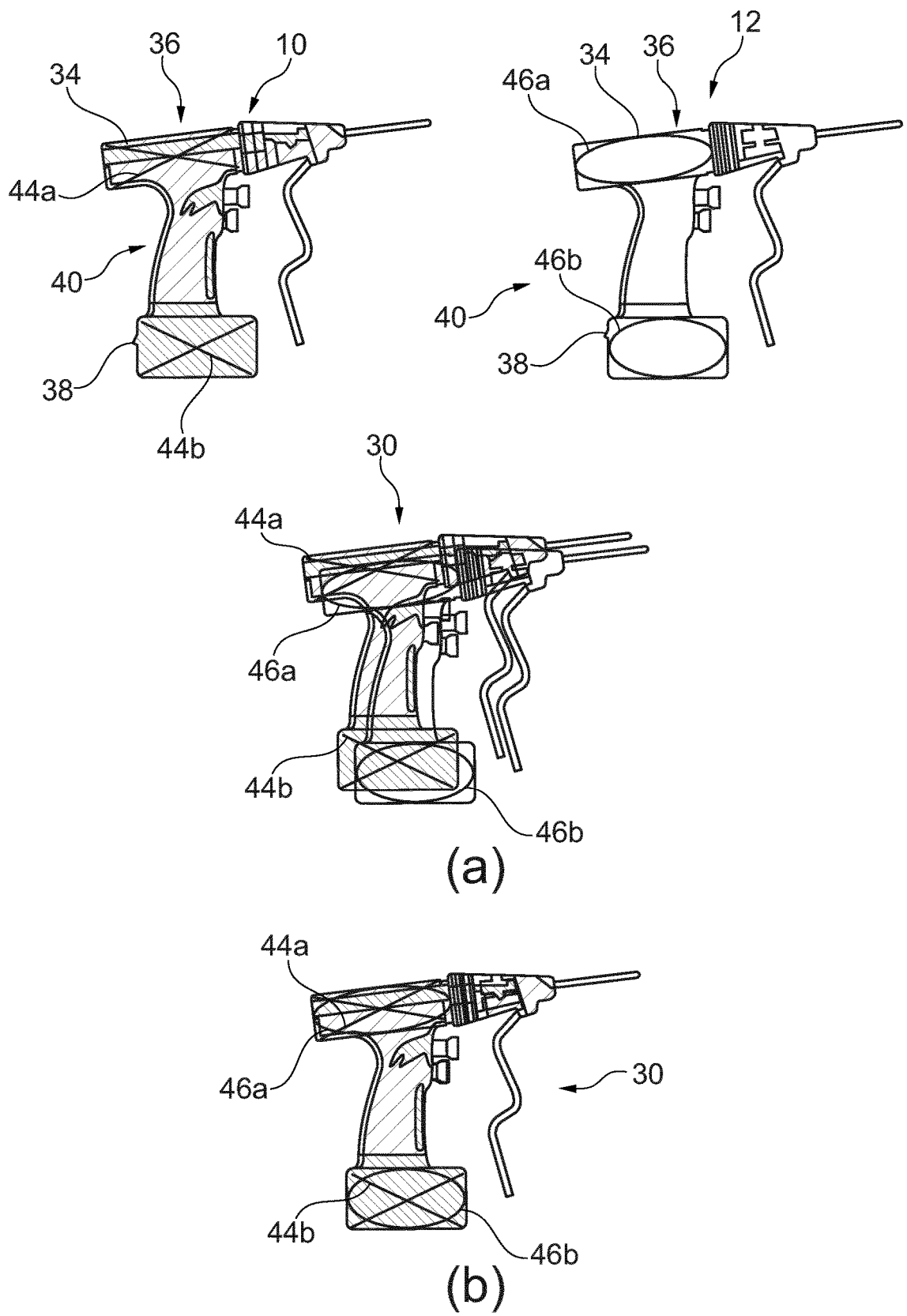
FIG. 8 illustrates another example of an alignment geometry and different stages of a corresponding alignment process between a virtual object and a real object.

FIG. 8 illustrates another example of an alignment feature and corresponding alignment examples between a virtual object 12 and a real object 10. The real object 10 comprises pairs of bisecting lines 34a, 34b diagonally bisecting lateral face of the rectangular section 34 of the drill body 36 and of the cuboid counterweight portion 38 of the drill handle 40, respectively, to facilitate alignment to the real object 10 with a surface pattern 26 highlighting a face of the real object 10 for alignment.

The virtual object 12 is visualized as a silhouette representation 24 and is further associated with an alignment geometry in the form of inscribed ellipses 46a, 46b inscribed into corresponding faces 34, 38 of the virtual object 12 in the field of view. A first ellipse 46a is inscribed into the lateral face of the rectangular section 34 of the drill body 36 and the second ellipse 46b is inscribed into the lateral face of the cuboid counterweight portion 38 of the drill handle 40. In FIG. 8, the circular alignment geometries 46a, 46b are illustrated as bounding lines of the circular shape, although the inscribed ellipses 46a, 46b may equally be shaded without loss of generality.

Figure elements (a) and (b) illustrate a process of the virtual object 12 approaching the real object 10, or vice versa, in two different illustrative stages. In stage (a), the virtual object 12 and the real object 10 are misaligned, such that the inscribed ellipses 46a, 46b are not centered to their respective faces 34, 38 on the real object 10 but protrude outwards from the faces 34, 38. Further, the inscribed ellipses 46a, 46b are not centered with respect to the bisecting lines 44a, 44b of the surface pattern 26 of the real object 10. The misalignment of the inscribed ellipses 46a, 46b and the real object 10 results in a perceived asymmetry for a human observer in the perceived composite object 30, which is enhanced by the mismatch between the inscribed ellipses 46a, 46b and the corresponding pairs of bisecting lines 44a, 44b of the surface pattern 26 of the real object 10. Hence, the human operator is provided with multiple alignment clues, as the surface pattern can indicate rough alignment information and contribute to the perceived asymmetry in the perceived composite object 30 in addition to the inscribed ellipses 46a, 46b allowing alignment to the respective faces 34, 38 of the real object. At the same time, minimal occlusion of the real object 10 is generated. In stage (b), the virtual object 12 and the real object 10 are aligned, such that the inscribed ellipses 46a, 46b connect the edges of the faces 34, 38 of the real object 10 and are centered with respect to the face 34, 38 and the pairs of bisecting lines 44a, 44b allowing confirmation of the correct alignment between the real object 10 and the virtual object 12.

The skilled person will appreciate that in the examples of FIGS. 6 and 7 the real object 10 may equally comprise a surface pattern 26 for facilitating the alignment task or for indicating faces 34, 38 on the real object 10 for alignment to the alignment features. In addition, the real object may also comprise polygons and/or ellipses inscribed into the respective faces 34, 38 as part of said surface pattern 26. Further, although FIGS. 6 to 8 illustrate alignment geometries inscribed into the faces 34, 38 of the real object 10, in some embodiments, the polygons 42a, 42b and/or ellipses 46a, 46b may also be circumscribed about the faces 34, 38 of the real object, when the real object 10 and the virtual object 12 are aligned.

FIG. 9 illustrates another example of an alignment feature and corresponding alignment examples between a virtual object 12 and a real object 10, wherein the left side of the FIG. illustrate side views whereas the right side illustrates the real object 10 and the virtual object 12 from the rear of the respective object. The alignment feature comprises a virtual mold 48 of the real object 10 while the virtual object 12 itself is not visualized in the depicted example.

The virtual mold 48 may be polygonal geometry which has a substantially cubic outer shape but is not filled in an inner portion corresponding to the shape of the virtual object 10. It may then be visualized as in FIG. 9 by rendering any pixel including an element of the virtual mold 48 which is not filled as transparent, such that the resulting visualization in the field of view corresponds to an inverse of the apparent contour of the virtual object 12. However, the visualization of the virtual mold 48 may also be generated by rendering the apparent contour of the virtual object 12 as a transparent view element and the virtual mold 48 as shaded virtual elements surrounding the transparent apparent contour of the virtual object 12, such that the virtual mold 48 complements and protrudes outward from the apparent contour of the virtual object 12 in the field of view.

In FIG. 9, the perceived composite object 30 is illustrated for the case of the real object and the virtual object being aligned. The virtual mold 48 then complements the apparent contour of the real object 10 and interlocks with the outline of the real object 10 in the field of view in what could be regarded as a "form-fitting manner". Hence, a human operator may confirm alignment based on the interlocking of the virtual mold 48 and the real object 10 and may identify misalignment based on occlusion of the real object 10. When the human operator changes the origin of the field of view, the virtual mold 48 may be re-rendered, such as to allow confirmation of the alignment from different view angles. In addition, the field of view may include a second virtual field of view containing the real object (not shown) which may rendered in the field of view based e.g. on a camera view, and the second virtual field of view may show the virtual mold 48 rendered according to the origin and view angle of the second virtual field of view to facilitate the alignment task in three spatial dimensions.

Figure 10:
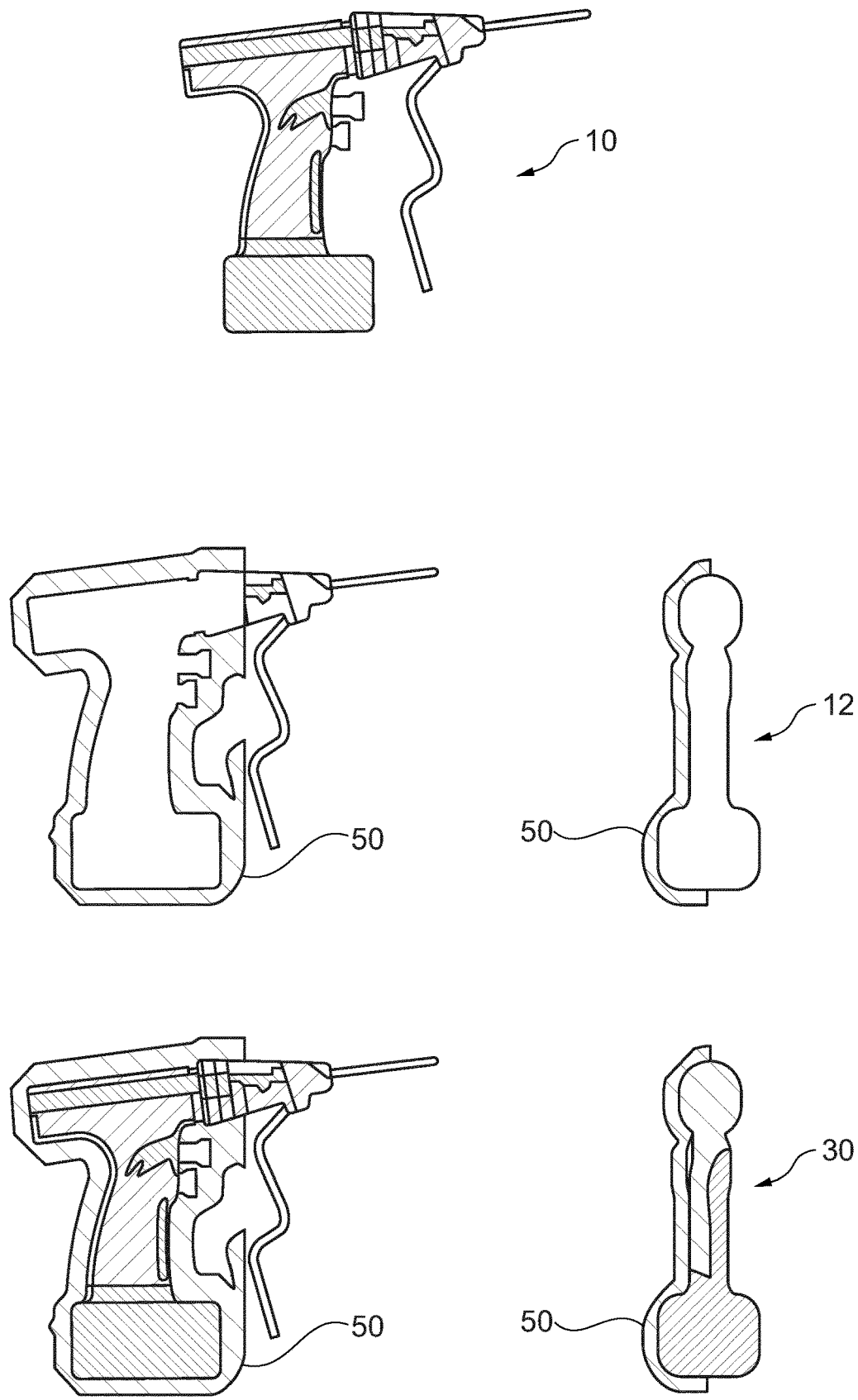
FIG. 10 illustrates another example of an alignment shape and a corresponding alignment example between a virtual object and a real object.

FIG. 10 illustrates another example of an alignment feature and corresponding alignment examples between a virtual object 12 and a real object 10, wherein the left (and center) side of the figure again illustrate side views of the respective objects 10, 12 whereas the right side illustrates the rear view of the respective object 10, 12. The alignment feature comprises a set of wrapping guides 50 of the virtual object 12 in one portion and a representation 18, 20, 22, 24 of the virtual object 12 in the other portion of the virtual object 12. The wrapping guides 50 may be a partial virtual mold visualized to not obstruct the contour of the virtual object 12 and may be provided as a shaded portion or as a set of equally spaced elements delimiting the apparent contour of the virtual object 12 according to the current pose of the virtual object 12. The wrapping guides 50 protrude outwards from the apparent contour of the virtual object 12 by a constant distance to form an extended perceived area for facilitating alignment of the real object 10 and the virtual object 12 in the field of view.

When the virtual object 12 and the real object 10 are aligned, the wrapping guides 50 wrap about and interlock with the apparent contour of the real object 10 in the perceived composite object 30 to allow confirmation of the alignment by the user. As the wrapping guides 50 protrude outwards from the apparent contour of the real object 10 in the field of view by a certain distance, visual confirmation by the human operator of the alignment can be improved as compared to e.g. a silhouette representation.

In the example depicted in FIG. 10, the wrapping guides 50 only partially wrap about the apparent contour of the virtual object 12 in one portion of the virtual object, while in the other portion, the virtual object 12 is visualized. This may provide an advantageous compromise between occlusion and guidance to the human operator, as the human operator may align finely detailed elements, such as the drill bit of the real object 10, according to the representation 18, 20, 22, 24 of the virtual object 12, whereas the pose of the body of the drill may be more easily aligned to the wrapping guides 50. Further, as shown on the right side of the figure, the alignment feature may only be presented in one (symmetric) half of the drill to consolidate advantages and disadvantages of the respective visualizations of the virtual object and the associated alignment features. The skilled person will appreciate that the concept of a partial alignment feature in on portion of the virtual object 12 and complemented by a representation 18, 20, 22, 24 of the virtual object 12 in another portion may also be applied to other previously discussed examples to obtain the aforementioned advantages. Further, the virtual object 12 may be visualized by a representation 18, 20, 22, 24 in its entirety alongside a partial alignment feature in embodiments.

Figure 11:
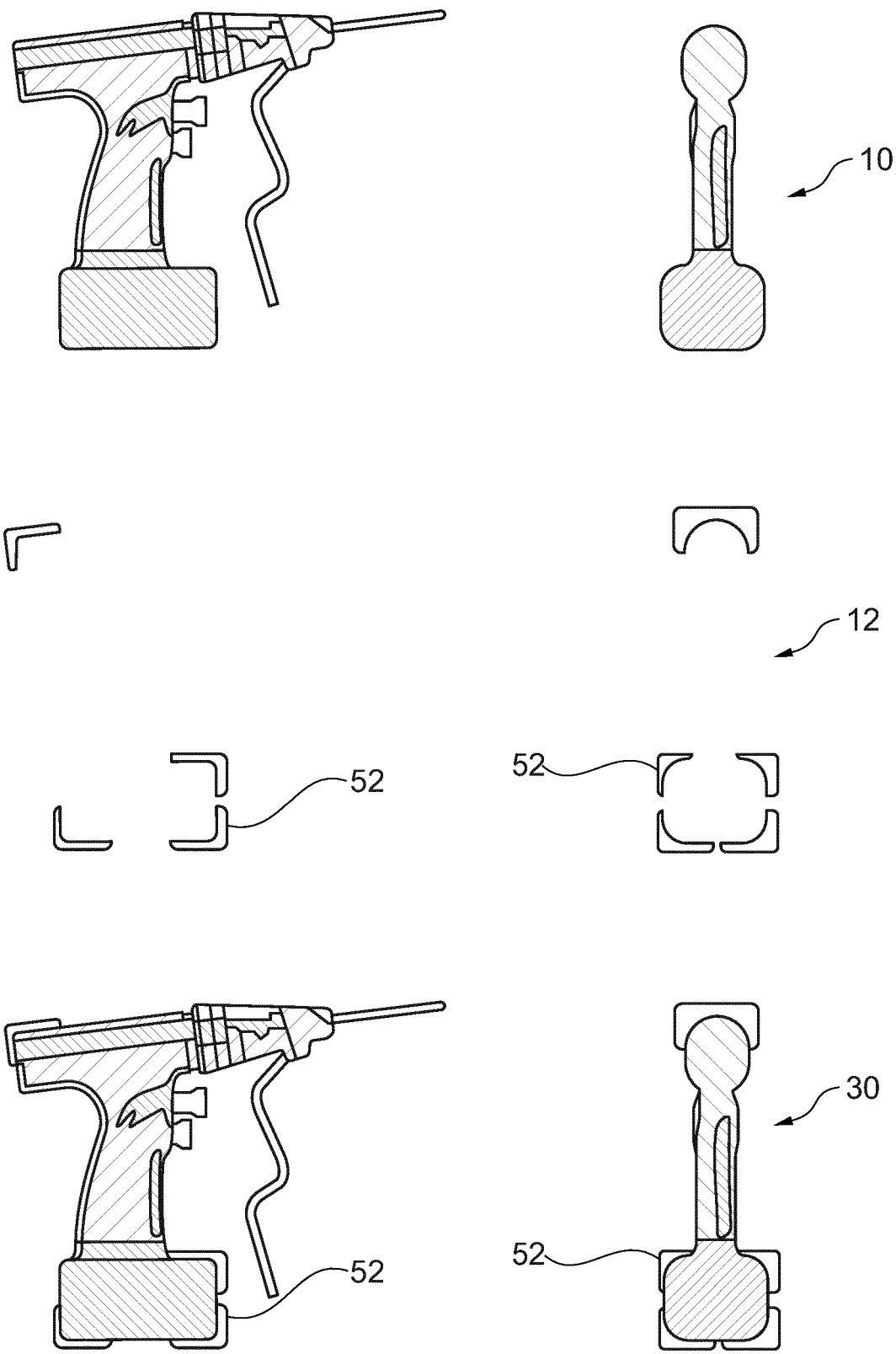
FIG. 11 illustrates another example of an alignment shape and a corresponding alignment example between a virtual object and a real object.

FIG. 11 illustrates another example of an alignment feature and corresponding alignment examples between a virtual object 12 and a real object 10, wherein the left side of the FIG. again illustrate side views of the respective objects 10, 12 whereas the right side illustrates the real object 10 and the virtual object 12 from the rear of the respective object 10, 12. The alignment feature comprises alignment guides 52 which complement the shape of the virtual object 12 (not visualized with a representation 18, 20, 22, 24 in FIG. 11) in specific portions of the shape. Specifically, the alignment guides are shaped to complement the rear of the drill body 36 and the corners of the cuboid counterweight portion of the drill handle 40 which are associated with extended surfaces of flat or substantially constant curvature and feature a sharp edge forming substantially perpendicular angles between meeting surfaces.

Similar to the virtual mold 48 and the wrapping guides 50, the alignment guides 52 complement the apparent contour of the real object 10 in the perceived composite object 30, when the real object 10 and the virtual object 12 are aligned, and may therefore improve both the speed and final accuracy of the alignment task. Since the alignment guides 52 are limited to meeting surfaces of sharp angle and/or associated with extended surfaces of flat or substantially constant curvature, the occlusion of the real object by the alignment feature may be at the same time be minimized.

Figures 12A, 12C:
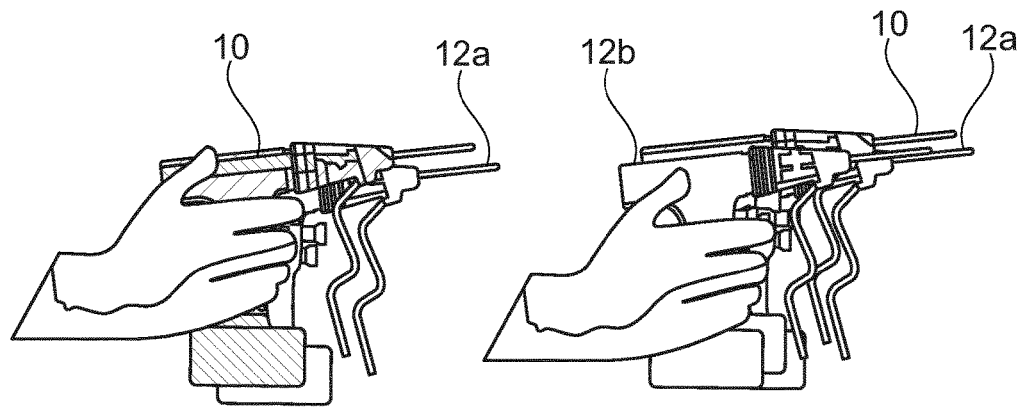
FIG. 12A-12E illustrate exemplary steps of a method for the alignment of a real object to a virtual object.
Figures 12B, 12D:
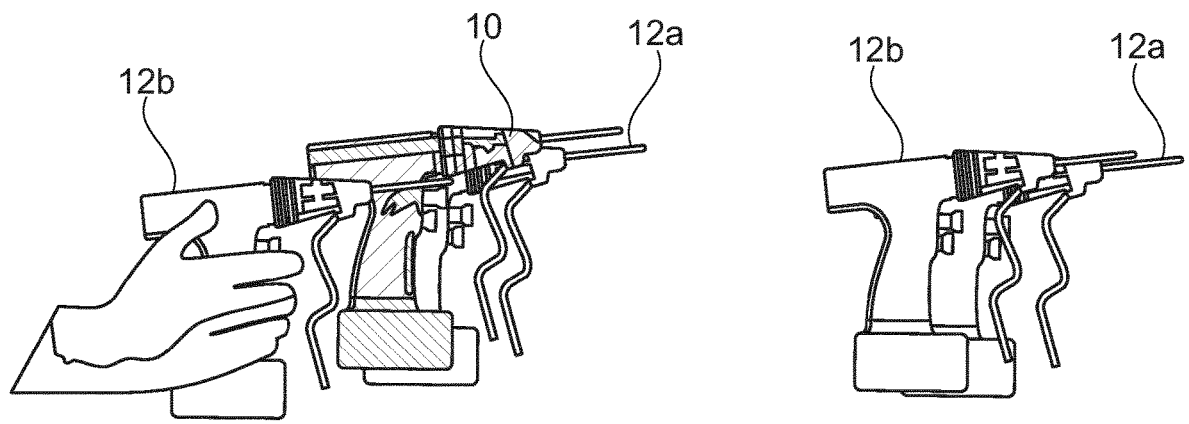
Figure 12E:
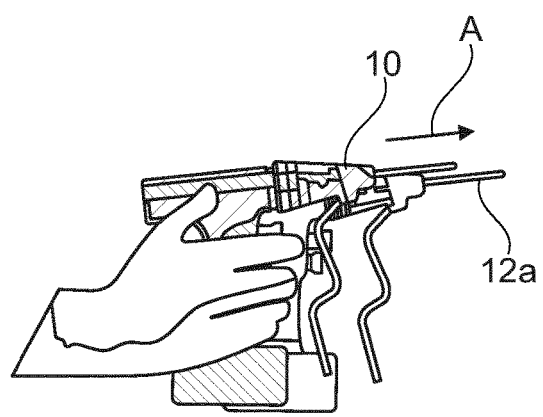

FIGS. 12A-E illustrate exemplary steps of a method for the alignment of a real object 10 to a virtual object 12. As alignment of the virtual object 12 to the real object 10 may be easier with current technology, the method may be separated into subtasks. In a first step depicted in FIG. 12A, a first virtual object 12a may be visualized with a representation 18, 20, 22, 24 alongside an optional alignment feature 28, 32a, 32b, 42a, 42b, 46a, 46b (not shown) and a human operator may approach the real object 10 towards the first virtual object 12a in a real-to-virtual (R2V) alignment step. In a second step depicted in FIG. 12B, a second virtual object 12b may be visualized with a representation 18, 20, 22, 24 alongside an optional alignment feature 28, 32a, 32b, 42a, 42b, 46a, 46b (not shown) to be aligned with the real object 10 in a more precise virtual-to-real (V2R) alignment step. In FIG. 12C, the human operator has aligned the second virtual object 12b to the real object 10 with a reduced mismatch of the respective poses. In a third step, a processing unit may calculate optimal displacement and/or rotation vectors to translate the second virtual object 12b towards the first object 12a or calculates a best guess of the true position of the real object 10 based on the positions of the first virtual object 12a and the second virtual object 12b, which may be offset as shown in the example shown in FIG. 12D. In a fourth step depicted in 12E, the human operator is presented with visualized instructions to improve the alignment of the real object, such as by visualizing the arrow A indicating a displacement vector for displacing the real object 10 towards a target pose.

The skilled person will appreciate that the different alignment features illustrated in the aforementioned examples may be freely combined to form a composite alignment feature or may be sequentially used in different stages of an alignment task.

The description of the preferred embodiments and the figures merely serve to illustrate the invention and the beneficial effects associated therewith, but should not be understood to imply any limitation. The scope of the invention is to be determined solely by the appended claims.

LIST OF REFERENCE SIGNS 10 real object
12 virtual object
12a, 12b first and second virtual object
14 hand
16 intended borehole
18 semitransparent rendering
20 wireframe geometry representation
22 partially shaded representation
24 silhouette representation
26 surface pattern of the real object
28 alignment pattern
30 perceived composite object
32a, 32b pairs of bisecting lines of alignment geometry
34 face of the rectangular section of the drill body
36 drill body
38 lateral face of the cuboid counterweight portion of the drill handle
40 drill handle
42a, 42b shaded polygons
44a, 44b pairs of bisecting lines of surface pattern
46a, 46b inscribed ellipses of alignment geometry
48 virtual mold
50 wrapping guides
52 alignment guides

The invention claimed is:

1. A positioning system to align the positions and orientations of a real object and a virtual object in real space, the virtual object corresponding to a virtual replica of the real object, the system comprising:
 a positioning module configured to determine an origin and a view angle of a field of view containing the real object in real space;
 a display module to visualize at least one alignment feature in the field of view according to the origin and the view angle;
 wherein the at least one alignment feature is superimposed on or replaces a representation of the virtual object in the field of view; and
 wherein the at least one alignment feature complements one or more of a shape and a surface pattern of the real object, such that the at least one alignment feature and the real object form a composite object with one or more of complementing patterns and complementing shapes in the field of view, when the real object and the virtual object are correctly aligned,
 wherein the at least one alignment feature comprises an alignment shape-which complements a shape of the real object when it is visualized in the field of view, such that the apparent contour of the real object in the field of view is complemented by the alignment shape, when the real object and the virtual object are correctly aligned, wherein the method visualizes a dynamic apparent contour of the alignment shape in the field of view containing the real object, such that the alignment shape would not obstruct a representation of the virtual object at the current position and having the current orientation of the virtual object in real space, wherein the alignment shape comprises a virtual mold of at least a portion of the virtual object, such that the alignment shape complements and protrudes outward from the apparent contour of the real object in the field of view, when the real object and the virtual object are correctly aligned.

2. The system of claim 1, further comprising a display to display the at least one alignment feature in the field of view.

3. The system of claim 1, further comprising a manipulation module to receive user input pertaining to one or more of a translation and a rotation of the virtual object and to update one or more of a position and a orientation of the virtual object in the field of view according to the user input.

4. The system of claim 1, further comprising a generation module configured to receive a virtual replica of the real object and to generate the at least one alignment feature based on the shape of a virtual replica of the real object.

5. The system of claim 1, wherein the alignment shape comprises a transparent view element corresponding to the apparent contour of the virtual object and one or more shaded virtual elements surrounding the apparent contour of the virtual object, such that the alignment shape complements and protrudes outward from the apparent contour of the real object in the field of view, when the real object and the virtual object are correctly aligned.

6. The system of claim 1, wherein the at least one alignment feature comprises a representation of the virtual object in a first portion of the virtual object and wrapping guides in another second portion of the virtual object, wherein the wrapping guides wrap about the apparent contour of the virtual object.

7. A method for aligning the positions and orientations of a real object and a virtual object in real space, the virtual object corresponding to a virtual replica of the real object, the method comprising:

visualizing at least one alignment feature superimposed on or replacing a representation of the virtual object in a field of view containing the real object, wherein the at least one alignment feature is indicative of a position and orientation of the virtual object in real space, wherein the at least one alignment feature complements one or more of a shape and a surface pattern of the real object, such that the at least one alignment feature and the real object form a composite object with one or more of complementing patterns and complementing shapes in the field of view, when the real object and the virtual object are correctly aligned, wherein the at least one alignment feature comprises a substantially two-dimensional alignment geometry fitting a face of the real object, wherein the shape of the alignment geometry differs from the outline of the face, such that the alignment geometry connects one or more of multiple edges and multiple vertices of the face of the object, when the real object and the virtual object are correctly aligned.

8. The method according to claim 7, wherein the alignment geometry comprises a bisecting alignment line which bisects the face, when the real object and the virtual object are correctly aligned.

9. The method according to claim 7, wherein the alignment geometry comprises an alignment polygon wherein the alignment polygon is inscribed into the face or circumscribed about the face, when the real object and the virtual object are correctly aligned.

10. The method according to claim 7, wherein the method further comprises generating the at least one alignment feature based on the surface pattern of a virtual replica of the real object.

11. The method according to claim 7, wherein the alignment geometry comprises an alignment ellipse, wherein the alignment ellipse is inscribed into the face or circumscribed about the face, when the real object and the virtual object are correctly aligned.

12. A method for aligning the positions and orientations of a real object and a virtual object in real space, the virtual object corresponding to a virtual replica of the real object, the method comprising visualizing at least one alignment feature superimposed on or replacing a representation of the virtual object in a field of view containing the real object, wherein the at least one alignment feature is indicative of a position and orientation of the virtual object in real space, wherein the at least one alignment feature complements one or more of a shape and a surface pattern of the real object, such that the at least one alignment feature and the real object form a composite object with one or more of complementing patterns and complementing shapes in the field of view, when the real object and the virtual object are correctly aligned, wherein the at least one alignment feature comprises an alignment pattern which is complimentary to a surface pattern on the real object, such that the surface pattern and the complimentary pattern form a characteristic continuous pattern, when the real object and the virtual object are correctly aligned.

13. The method according to claim 12, wherein the alignment pattern comprises a repeating alignment pattern in contrasting colors overlaying a shape of the virtual object, wherein the repeating alignment pattern complements a repeating pattern on the real object, such that the repeating pattern of the real object and the repeating alignment pattern form a characteristic continuous pattern, when the real object and the virtual object are correctly aligned.

14. The method according to claim 12, wherein the alignment pattern forms a repeating superposition pattern with the surface pattern on the real object, when the real object and the virtual object are not correctly aligned.

15. The method according to claim 12, wherein the field of view shows a second virtual field of view containing the real object, wherein the second virtual field of view comprises at least one second alignment feature superimposed on or replacing a representation of the virtual object in the second virtual field of view.

16. The method according to claim 15, wherein the second alignment feature visualized in the second virtual field of view is different from the at least one alignment feature.

17. The method according to claim 12, wherein the at least one alignment feature is visualized in a head mounted display of an operator augmenting the perceived field of view containing the real object.

18. The method according to claim 12, wherein the method further comprises generating the at least one alignment feature based on the surface pattern of a virtual replica of the real object.

19. The method according to claim 12, wherein the at least one alignment is visualized in a camera view containing the real object or a three-dimensional view derived of said camera view.

* * * * *